(12) United States Patent
Qian

(10) Patent No.: US 11,902,737 B2
(45) Date of Patent: Feb. 13, 2024

(54) DIRECTIONAL SOUND CAPTURE USING IMAGE-BASED OBJECT TRACKING

(71) Applicant: HANGZHOU TARO POSITIONING TECHNOLOGY CO., LTD., Hangzhou (CN)

(72) Inventor: Hao Qian, Hangzhou (CN)

(73) Assignee: HANGZHOU TARO POSITIONING TECHNOLOGY CO., LTD., Hangzhou (CN)

( * ) Notice: Subject to any disclaimer, the term of this patent is extended or adjusted under 35 U.S.C. 154(b) by 384 days.

(21) Appl. No.: 17/421,996

(22) PCT Filed: Jan. 9, 2019

(86) PCT No.: PCT/CN2019/071039
§ 371 (c)(1),
(2) Date: Jul. 9, 2021

(87) PCT Pub. No.: WO2020/142952
PCT Pub. Date: Jul. 16, 2020

(65) Prior Publication Data
US 2022/0116700 A1  Apr. 14, 2022

(51) Int. Cl.
*G06T 7/246* (2017.01)
*H04R 1/32* (2006.01)
(Continued)

(52) U.S. Cl.
CPC .......... *H04R 1/326* (2013.01); *G06T 7/246* (2017.01); *H04R 1/083* (2013.01); *H04R 29/005* (2013.01);
(Continued)

(58) Field of Classification Search
CPC ...... H04R 1/326; H04R 1/083; H04R 29/005; H04R 2201/02; H04R 2201/40;
(Continued)

(56) References Cited

U.S. PATENT DOCUMENTS

| | | | |
|---|---|---|---|
| 10,484,799 B1* | 11/2019 | Ye | H04R 3/00 |
| 2011/0014981 A1* | 1/2011 | Mao | H04R 3/005 |
| | | | 463/36 |
| 2018/0232471 A1* | 8/2018 | Schissler | G06F 18/2413 |

FOREIGN PATENT DOCUMENTS

| | | |
|---|---|---|
| CN | 102186051 A | 9/2011 |
| CN | 107564064 A | 1/2018 |
| CN | 108605081 A | 9/2018 |

OTHER PUBLICATIONS

International Search Report issued in International Application No. PCT/CN2019/071039 dated Oct. 10, 2019 (3 pages).
(Continued)

*Primary Examiner* — Chuong A Ngo
(74) *Attorney, Agent, or Firm* — Osha Bergman Watanabe & Burton LLP

(57) ABSTRACT

A method for directional sound capture. The method includes capturing, using a camera device, a sequence of images of a scene comprising a light source attached to a sound source object, detecting, by a hardware processor based on a pattern of local light change across the sequence of images, the light source in the scene, determining a direction of the sound source object by at least determining a location of the light source in at least one image of the sequence of images, transmitting, to a direction control device coupled to a microphone, a control signal to direct a sensitivity direction of the microphone towards the sound source object, and capturing, using the microphone and in response to directing the sensitivity direction of the microphone towards the sound source object, the sound emitted from the sound source object.

22 Claims, 11 Drawing Sheets

(51) Int. Cl.
    *H04R 1/08*           (2006.01)
    *H04R 29/00*        (2006.01)

(52) U.S. Cl.
    CPC ...... *H04R 2201/02* (2013.01); *H04R 2201/40* (2013.01)

(58) Field of Classification Search
    CPC .......... H04R 1/08; H04R 3/005; H04R 1/406; G06T 7/246; H04N 23/56
    See application file for complete search history.

(56) References Cited

OTHER PUBLICATIONS

Written Opinion issued in International Application No. PCT/CN2019/071039 dated Oct. 10, 2019 (4 pages).

\* cited by examiner

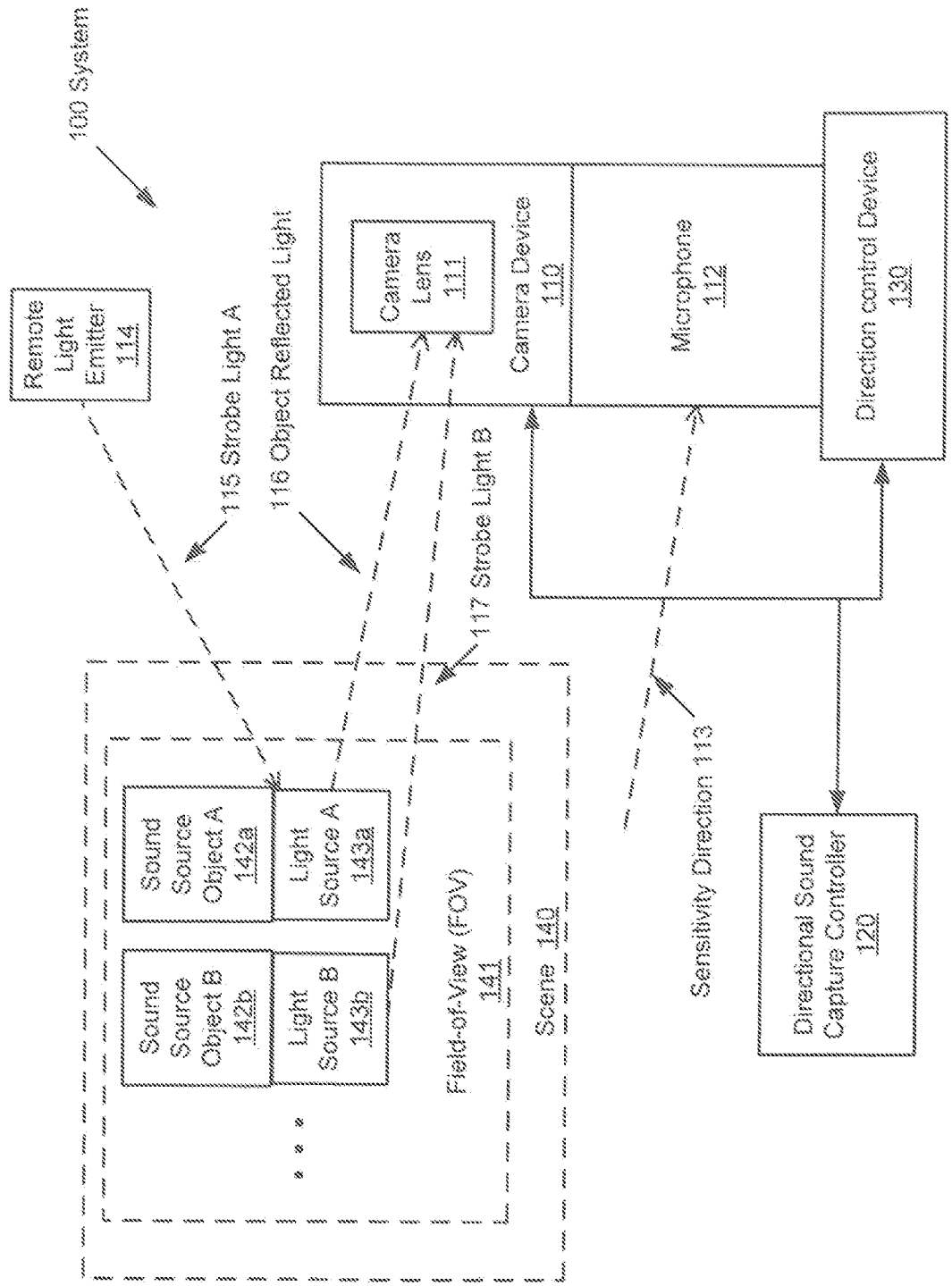
FIG. 1.1

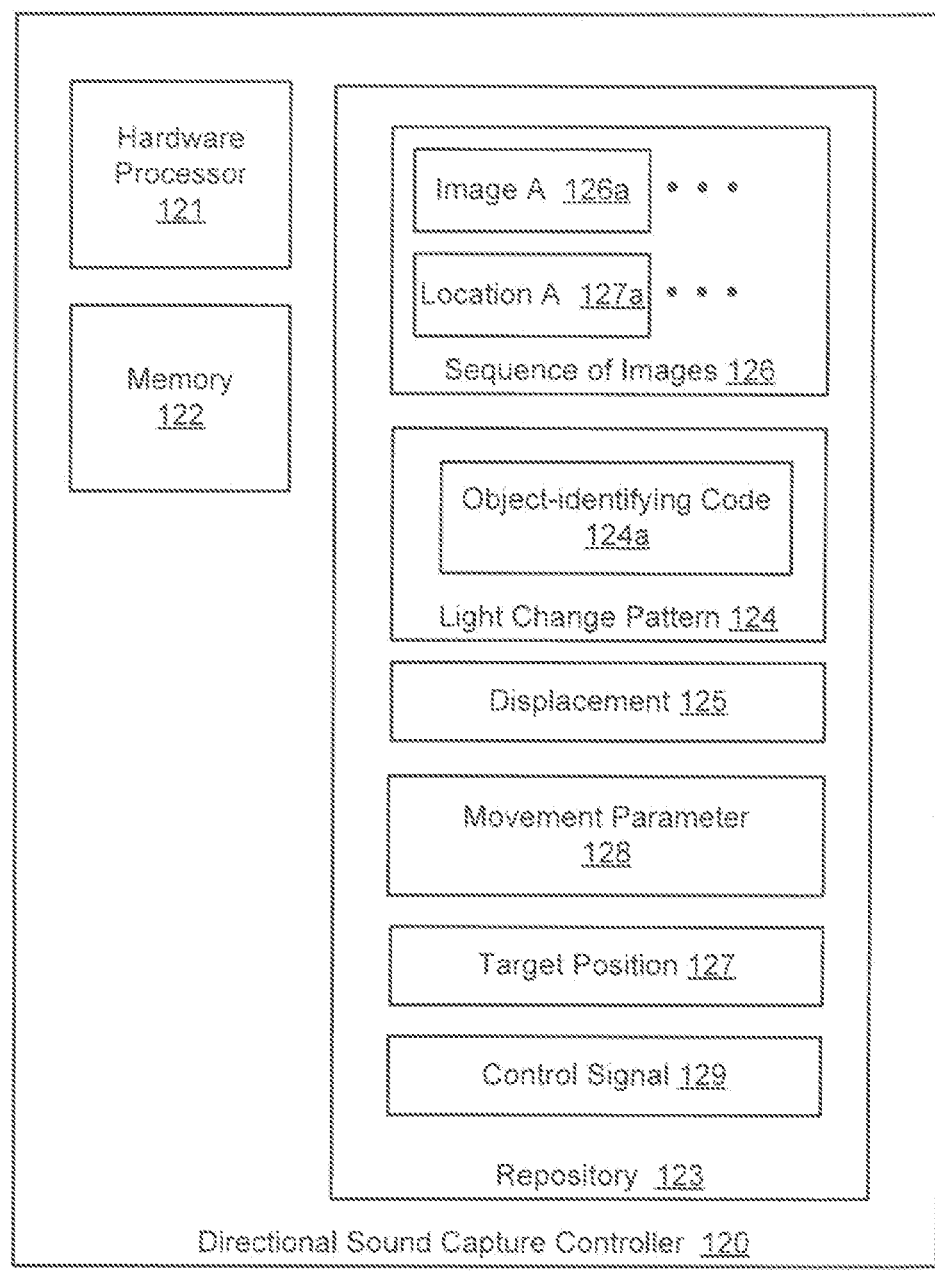
FIG. 1.2

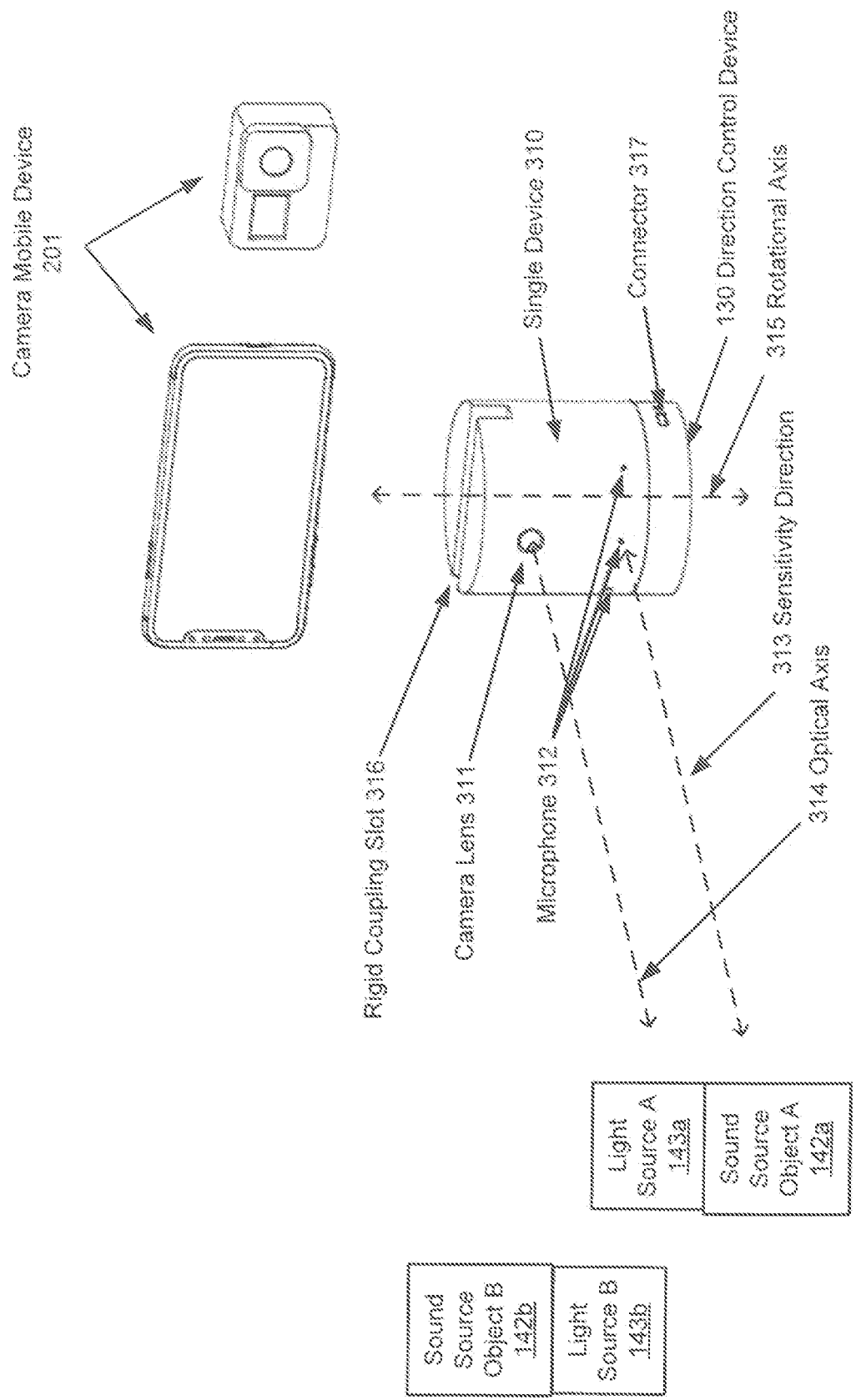
FIG. 3.1

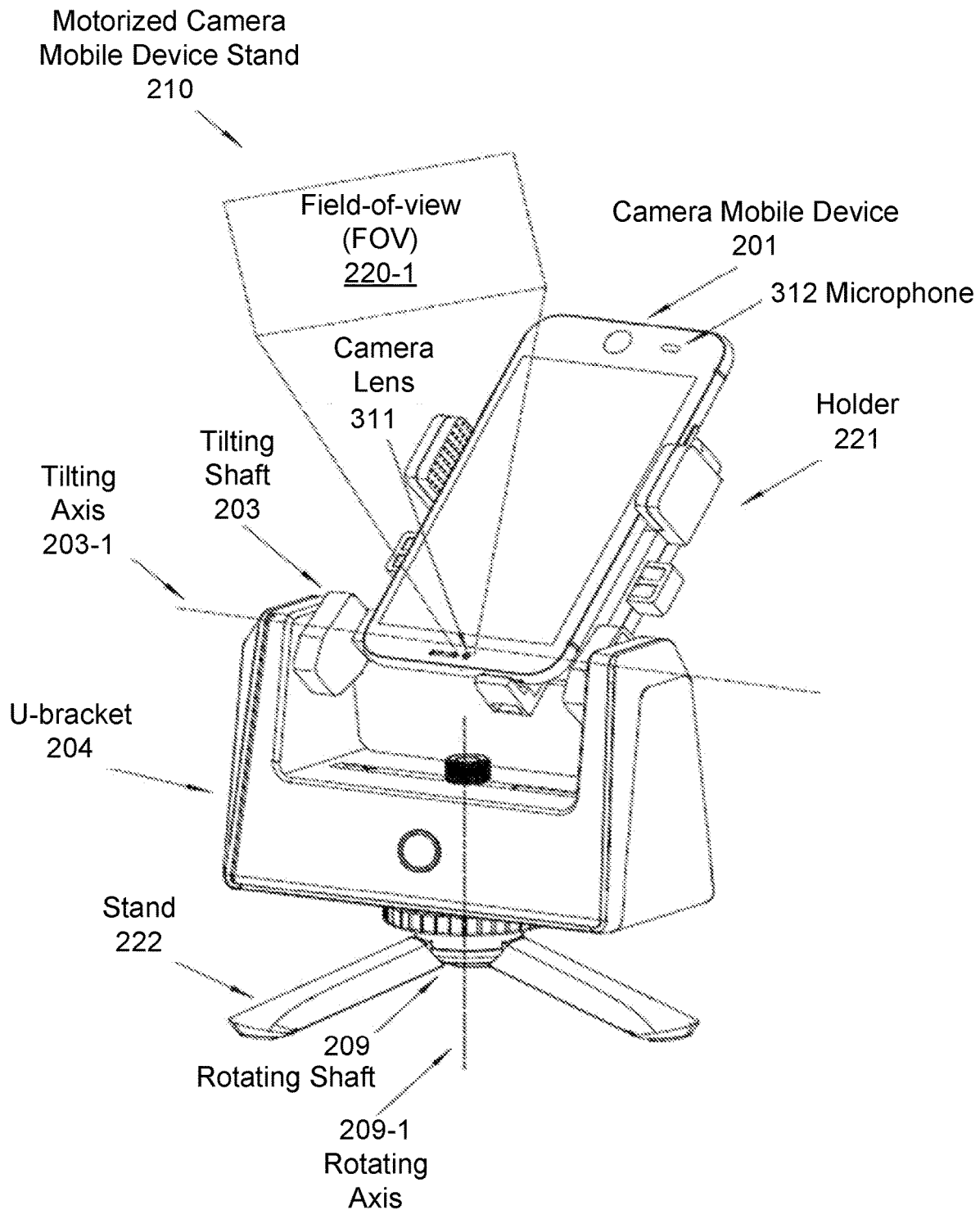
FIG. 3.2

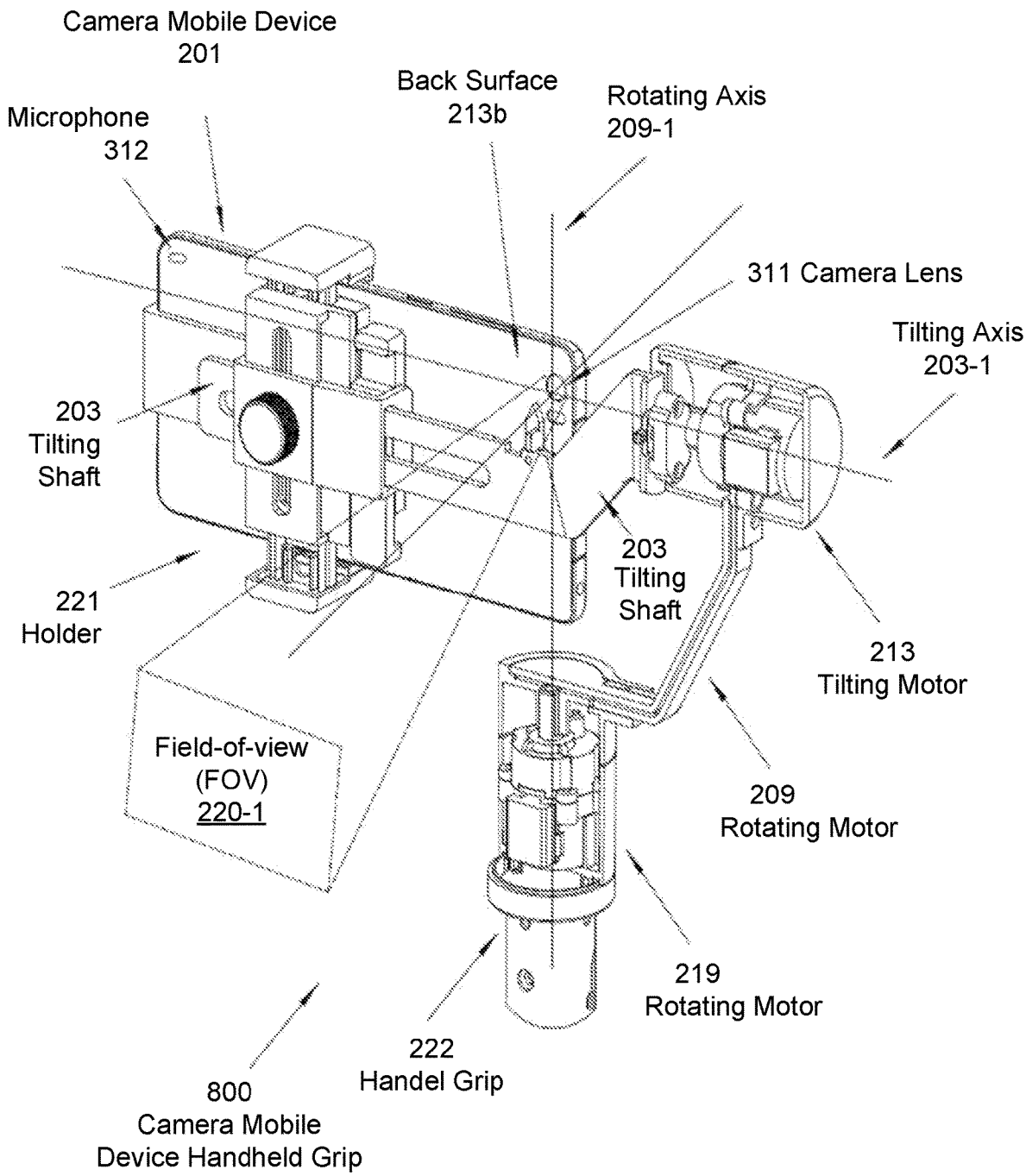
*FIG. 3.3*

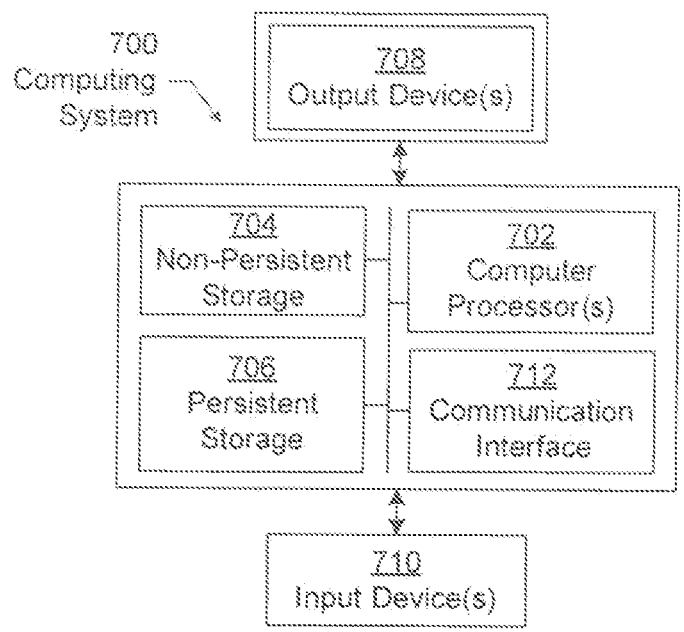
FIG. 7.1
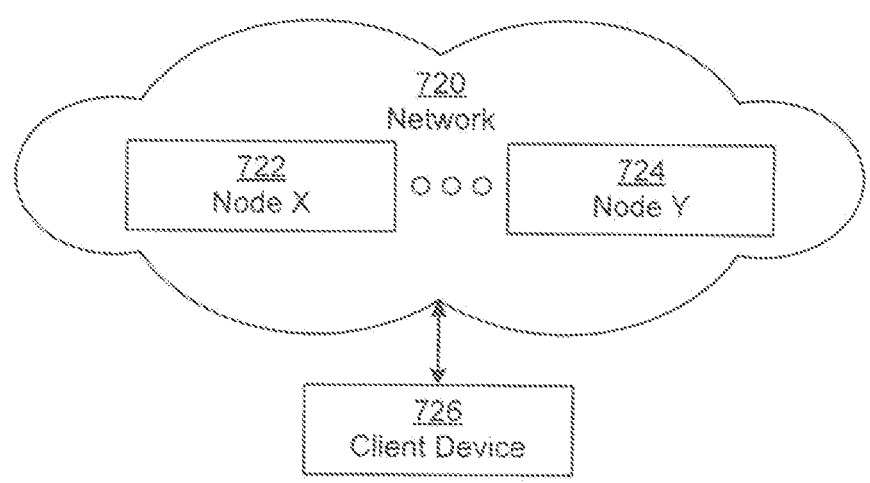
FIG. 7.2

DIRECTIONAL SOUND CAPTURE USING IMAGE-BASED OBJECT TRACKING

BACKGROUND

A field-of-view (FOV) is an extent of a scene that is imaged by a camera. A sound source object inside the FOV will appear in an image captured and/or outputted by the camera. For example, the FOV may correspond to a solid angle within which a camera lens projects light input to an optical sensor of the camera.

A sound field is an extent of a sound wave that is captured by a microphone based on a transducer converting air pressure variation of the sound wave into an electrical signal. The sensitivity of the microphone is the ratio of the electrical signal magnitude over the sound wave magnitude. Commonly used transducer includes a suspended electrical wire coil in a magnetic field, a vibrating diaphragm as a capacitor plate, a piezoelectric crystal, etc. A microphone may have different sensitivity in different direction due to the mechanical structure of the transducer. The higher sensitivity indicates that the sound wave received in a certain direction (referred to as a sensitivity direction) is higher than other directions, causing a higher signal-noise ratio in the sensitivity direction. A polar pattern is a variation pattern in sensitivity over 360 degrees around the microphone with the microphone in the center and 0 degrees representing the front of the microphone. The sensitivity direction of the microphone is the direction with maximum sensitivity in the polar pattern of the microphone. Common polar patterns of a microphone includes omnidirectional patter, unidirectional pattern, and cardioid pattern. Omnidirectional pattern is equally sensitive to sound arriving from all angles. Unidirectional pattern is most sensitive to sound arriving from directly in front and less sensitive in other directions. Cardioid pattern resembles a heart shape has a wide on-axis pick-up area and maximum rejection at 180 degrees off-axis.

SUMMARY

In general, in one aspect, the invention relates to a method for directional sound capture. The method includes capturing, using a camera device, a sequence of images of a scene comprising a light source attached to a sound source object, detecting, by a hardware processor based on a pattern of local light change across the sequence of images, the light source in the scene, determining a direction of the sound source object by at least determining a location of the light source in at least one image of the sequence of images, transmitting, to a direction control device coupled to a microphone, a control signal to direct a sensitivity direction of the microphone towards the sound source object, and capturing, using the microphone and in response to directing the sensitivity direction of the microphone towards the sound source object, the sound emitted from the sound source object.

In general, in one aspect, the invention relates to a directional sound capture controller. The directional sound capture controller includes a computer processor and memory coupled to the computer processor and storing instructions, when executed, causing the computer processor to capture, using a camera device, a sequence of images of a scene comprising a light source attached to a sound source object, detect, based on a pattern of local light change across the sequence of images, the light source in the scene, determine a direction of the sound source object by at least determining a location of the light source in at least one image of the sequence of images, generate, based on the direction of the sound source object, a control signal for directing a sensitivity direction of a microphone towards the sound source object, and capture, using the microphone and in response to the control signal, sound emitted from the sound source object.

In general, in one aspect, the invention relates to a system for directional sound capture. The system includes a light source attached to a sound source object in a scene, a camera device configured to capture a sequence of images of the scene, a microphone for the directional sound capture, a direction control device where the microphone is mounted, and a directional sound capture controller configured to detect, based on a pattern of local light change across the sequence of images, the light source in the scene, determine a direction of the sound source object by at least determining a location of the light source in at least one image of the sequence of images, generate, based on the direction of the sound source object, a control signal for directing a sensitivity direction of a microphone towards the sound source object, and capture, using the microphone and in response to the control signal, sound emitted from the sound source object.

In general, in one aspect, the invention relates to a non-transitory computer readable medium storing instructions for analyzing a sound source object in a scene. The instructions, when executed by a computer processor, include functionality for capturing, using a camera device, a sequence of images of a scene comprising a light source attached to a sound source object, detecting, based on a pattern of local light change across the sequence of images, the light source in the scene, determining a direction of the sound source object by at least determining a location of the light source in at least one image of the sequence of images, transmitting, to a direction control device coupled to a microphone, a control signal to direct a sensitivity direction of the microphone towards the sound source object, and capturing, using the microphone and in response to directing the sensitivity direction of the microphone towards the sound source object, the sound emitted from the sound source object.

Other aspects of the invention will be apparent from the following description and the appended claims.

BRIEF DESCRIPTION OF DRAWINGS

FIGS. 1.1 and 1.2 show a schematic block diagram of a system in accordance with one or more embodiments of the invention.

FIGS. 3.1, 3.2, 3.3, 3.4, 4, 5, and 6 show various examples in accordance with one or more embodiments of the invention.

FIGS. 7.1 and 7.2 show a computing system in accordance with one or more embodiments of the invention.

DETAILED DESCRIPTION

Figure 2:
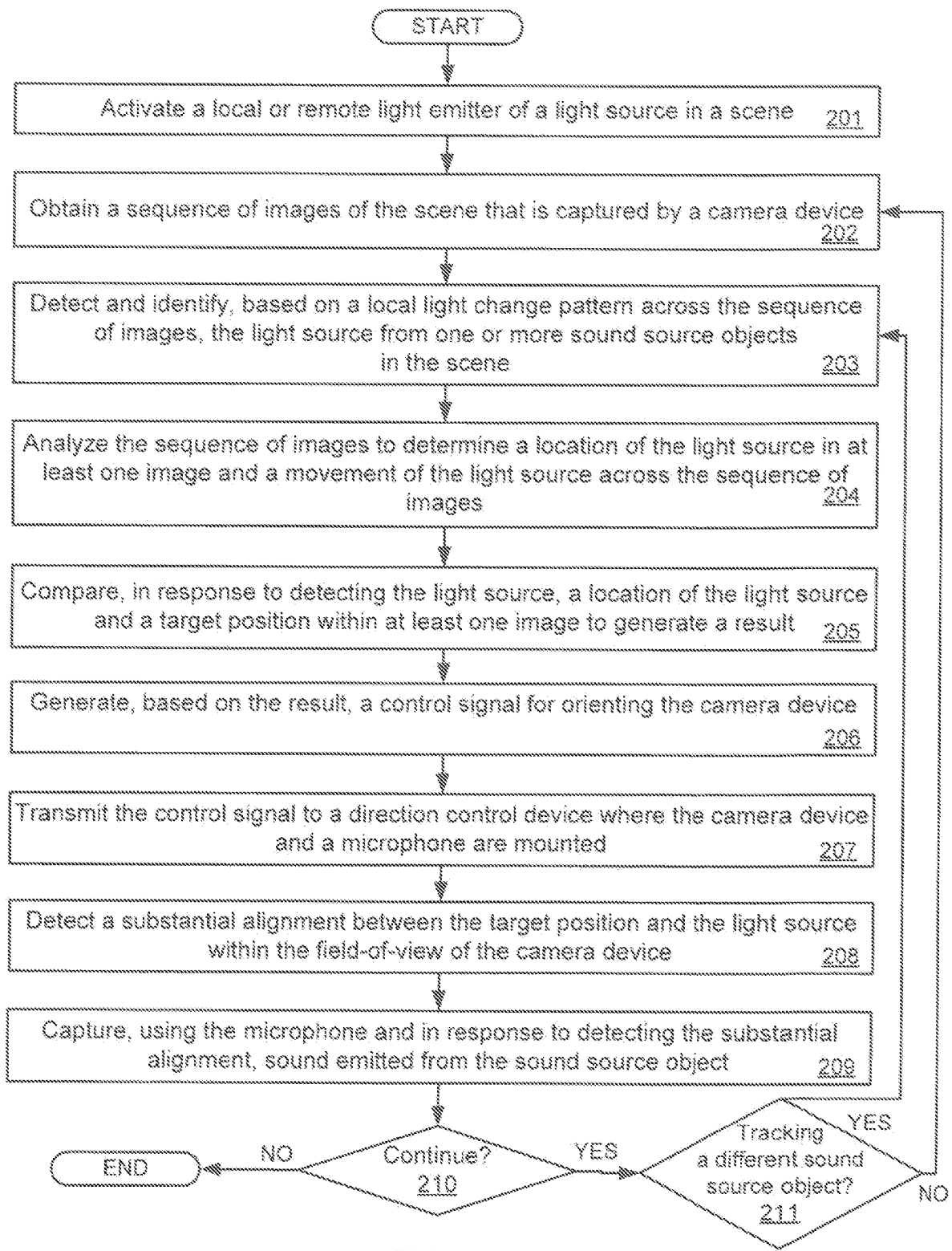
FIG. 2 shows a method flowchart in accordance with one or more embodiments of the invention.
Figure 34:
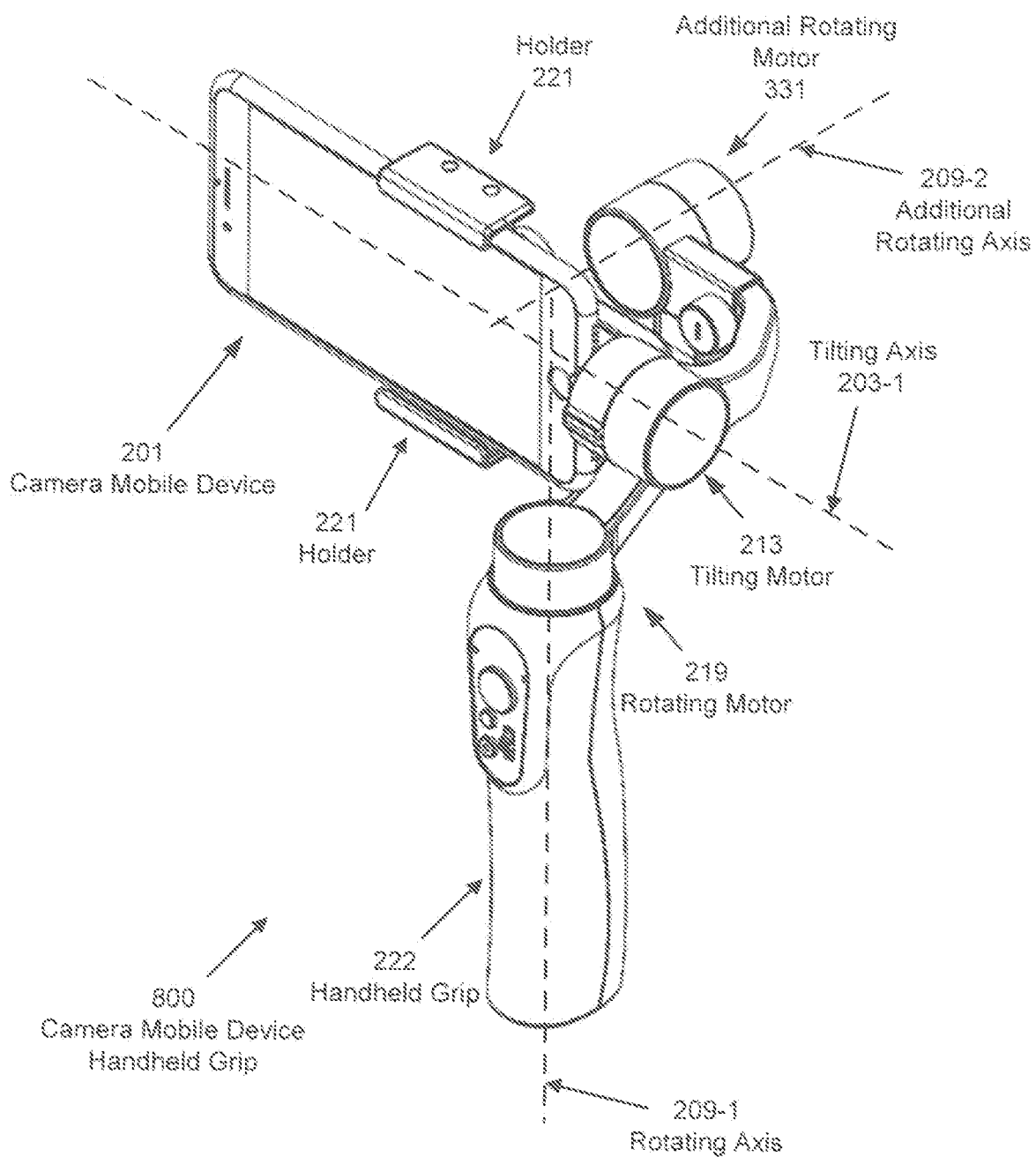

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist. Further, a solid line or a dash line connecting the components of a figure represent a relationship between the connected components. The dash line indicates that the relationship may not include or otherwise associate with any physical connection or physical element.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention provides a method to improve sound capture by aligning a microphone toward a sound source object. In one or more embodiments of the invention, a light source is attached to the sound source object while a sequence of images are captured using a camera device that is coupled to the microphone. In one or more embodiments, the light source produces a local light change pattern across the sequence of images. Based on the local light change pattern, the light source is detected in the sequence of images. Accordingly, a direction of the sound source object is determined by at least determining a location of the light source in the sequence of images. A control signal is then generated for directing a sensitivity direction of the microphone towards the sound source object. In response to the control signal, sound emitted from the sound source object is captured using the microphone.

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes a camera device (110) having a camera lens (111), a microphone (112) coupled to the camera device (110), a directional sound capture controller (120), a direction control device (130), a scene (140), a field-of-view (FOV) (141) of the camera lens (111), sound source object(s) (e.g., sound source object A (142a), sound source object B (142b)) appearing within the FOV (141), a remote light emitter (114), and light source(s) (e.g., light source A (143a), light source B (143b)) attached to the sound source object(s). In one or more embodiments of the invention, the microphone (112) and the camera device (110) are rigidly coupled to each other such that a sensitivity direction (113) of the microphone (112) and an optical axis of the camera lens (111) are substantially aligned with each other. In one or more embodiments of the invention, the sensitivity direction (113) of the microphone (112) may be electronically adjusted to substantially align with an optical axis of the camera lens (111). In one or more embodiments, substantially aligned sensitivity direction (113) of the microphone (112) and optical axis of the camera lens (111) are parallel to each other with sufficiently small distance (e.g., 5 inch or less) from each other. In one or more embodiments, substantially aligned sensitivity direction (113) of the microphone (112) and optical axis of the camera lens (111) are coaxial to each other. Further, attaching a light source to a sound source object means that the light source is physically located within a pre-determined range from the sound source object or from a sound emitting point of the sound source object. The pre-determined range is sufficiently small (e.g., 5 inch or less) such that the location of the light source represents the location of the sound source object or the sound emitting point of the sound source object within a sufficiently small tolerance (e.g., 5 inch or less).

A light source is a source of light where the light is captured by the camera device (110). For example, the light source A (143a) is shown as a reflective light source attached to the sound source object A (142a) with the remote light emitter (114) emitting a strobe light A (115) that shines on the reflective light source A (143a) to generate an object reflected light (116). In addition, the light source B (143b) is a local light emitter attached to the sound source object B (142b) and emitting a strobe light B (117). Accordingly, the object reflected light (116) and strobe light B (117) are captured by the camera device (110) via the camera lens (111) to contribute to one or more images. In addition, ambient light (not shown) is also a light source contributing to the image(s) captured by the camera device (110). The term "light source" may also refer to a corresponding spot produced by the light source in the captured image. Throughout this disclosure, the remote light emitter and local light emitter are referred to as light emitters, and the strobe light may be emitted by the remote light emitter or the local light emitter. Further, the camera device (110), microphone (112), directional sound capture controller (120), and direction control device (130) are communicatively coupled to each other. In one or more embodiments of the invention, two or more of the remote light emitter (114), camera device (110), microphone (112), directional sound capture controller (120), and direction control device (130) are integrated into a single device. For example, the camera device (110) and microphone (112) may be combined as a single device. Further, at least a portion of the directional sound capture controller (120) may be included in the camera device (110). In another example, at least a portion of the directional sound capture controller (120) may be included in the direction control device (130). In still another example, one part of the directional sound capture controller (120) is included in the camera device (110) while another part of the directional sound capture controller (120) is included in the direction control device (130). Similarly, the remote light emitter (114) may be integrated with the camera device (110), directional sound capture controller (120), or direction control device (130).

In one or more embodiments of the invention, a light emitter (e.g., the remote light emitter (114) or the local light emitter of the light source B (143b)) is any device that emits light. For example, the light emitter may emit light across a large angle (e.g., exceeding 45 degree plane angle, 1 square radian solid angle, etc.) as a flood light emitter. In another example, the light may emit a collimated light beam as a collimated light emitter. The remote light emitter (114) may be separate, e.g., by certain distance such as 1 meter or more, from the sound source object A (142a). In one or more embodiments, the light emitter includes a light-emitting-diode (LED). In one or more embodiments, the strobe light (e.g., strobe light A (115), strobe light B (117)) changes intensity and/or wavelength from time to time. For example, the strobe light may produce a free-running light change pattern according to a particular duty cycle (i.e., a percentage of time when the light pattern has a bright level) and repetition rate (i.e., a number of time the intensity changes during a unit time period). As used herein, light change pattern is a pattern of intensity and/or wavelength change in the light. In one or more embodiments, the light emitter produces a light change pattern with a low repetition rate (e.g., 10 hertz, 20 hertz, etc.) comparing to a frame rate of the camera device (110). The frame rate is a number of images (e.g., a burst of still images or a video recording) captured by the camera device (110) during a unit time. In one or more embodiments, the light emitter produces a light change pattern that is synchronized with the frame rate of the camera device (110). In one or more embodiments, the light emitter emits an infrared light. In other words, the strobe light has an infrared wavelength, e.g., between 700 nanometers (nm) and 1 millimeter (mm). Throughout this disclosure, the term "infrared wavelength" refers to a wavelength between 700 nm and 1 mm. In one or more embodiments, the light change pattern produced by the strobe light represents encoded digital data. For example, the encoded digital data produced by an infrared strobe light may be similar to an infrared remote control code.

In one or more embodiments of the invention, the reflective light source A (143a) is a reflective region of the sound source object A (142a) that reflects the strobe light A (115) to generate the object reflected light (116). In this context, the reflective light source A (143a) is said to emit the object reflected light (116). In one or more embodiments, the reflective region has a higher reflectance for infrared wavelength than for visible wavelength. For example, the higher reflectance may be based on reflective material with a higher reflectivity for infrared wavelength than for visible wavelength. While both the strobe light A (115) and ambient light (not shown) shine on the reflective region, the object reflected light (116) may have higher infrared reflected content from the strobe light A (115) than visible reflected content from ambient visible light. In one or more embodiments, the sound source object A (142a) is a human, animal, robot, or any other sound emitting item, and the reflective light source A (143a) includes a reflective material attached to the sound source object A (142a). Similarly, the sound source object B (142b) may also be a human, animal, robot, or any other sound emitting item. Although not explicitly shown, the light source B (143b) may also be a reflective light source and include a reflective material attached to the sound source object B (142b). For example, the reflective material may be part of a wrist band, arm band, belt, finger ring, pendant, necklace, hat, glove, clothing, etc. worn by or otherwise attached to the human, animal, robot, or any other moving item. In one or more embodiments, the reflective material may include metal, dielectric material, or a combination of metal and dielectric material. In one or more embodiments, the reflective material may be a coating layer or painted film on the surface of the aforementioned wrist band, arm band, belt, finger ring, pendant, necklace, hat, glove, clothing, etc. For example, the coating layer or painted film may include infrared reflective pigments such as titanium dioxide. In particular, the titanium dioxide may have a reflectance exceeding 75% for the infrared wavelength.

In one or more embodiments, the reflective material includes a geometric pattern having geometrically varying reflectivity for infrared wavelength to produce a geometric light change pattern. In particular, the geometric pattern of the reflective material produces a spatial variation of the object reflected light that is captured by the camera lens as additional distinction from ambient light. In other words, the geometric pattern enhances the accuracy of detection of the reflective light source. As used herein, geometric light change pattern is a pattern of intensity change in the light according to the geometric pattern. For example, the geometric pattern may be created by surface coating/painting using the aforementioned infrared reflective pigments such as titanium dioxide. In one or more embodiments, the object reflected light (116) from the reflective light source A (143a) includes time modulation based on the aforementioned light change pattern originated from the remote light emitter (114) and/or spatial modulation based on the geometric light change pattern of the reflective light source A (143a).

In one or more embodiments of the invention, the microphone (112) is a transducer that converts sound into an electrical signal. In one or more embodiments, the microphone (112) is sensitive to sound coming from one or more directions, referred to the sensitivity direction (113) of the microphone (112). As a result, the microphone (112) converts sound with higher efficiency for sound source object(s) located along the sensitivity direction (113) of the microphone (112). In one or more embodiments, the microphone (112) is a microphone array, which includes multiple microphones arranged in an array pattern to increase the directionality of the microphone (112). In other words, the array pattern increases the sensitivity of the microphone (112) along the sensitivity direction (113) and decreases the sensitivity of the microphone (112) away from the sensitivity direction (113). Beamforming is a signal processing technique used in sensor arrays for directional signal transmission or reception. Beamforming is achieved by combining elements in an sensor array in such a way that signals at particular angles experience constructive interference while others experience destructive interference. The beamforming technique may be used in a microphone or microphone array for directional sound input and output. Signals captured by multiple microphones in a microphone array are combined in a way where the expected directional signal reception is observed. By using beamforming algorithms, such as MVDR, a microphone or microphone array may increase its sensitivity in a single direction while reduce sensitivity in all other directions, so as to create a beamforming direction that has a higher sensitivity than other direction. In one or more embodiments, the microphone array has a variable beamforming direction controlled by an electronic control signal. For example, the electronic signal may adjust how different signals captured by multiple microphones in the microphone array are combined using the beamforming algorithm. Accordingly, the sensitivity direction (113) of the microphone (112) is adjusted by the electronic control signal.

In one or more embodiments of the invention, the camera device (110) is a device with a camera lens (e.g., camera lens (111)) and associated components for taking photographs and/or video recordings. For example, the associated components may include a complementary-metal-oxide-semiconductor (CMOS) or charge-couple-device (CCD) sensing element configured to generate a pixel based image based on light projected onto the CMOS or CCD sensing element along an optical axis of the camera lens (111). The optical axis is a line along which a rotational symmetry of the camera lens (111) exists. In one or more embodiments, the camera lens (111)) is associated with a CMOS or CCD sensor for generating IR images and a CMOS or CCD sensor for generating visible light images. For example, the IR image sensing element and the visible light sensing element may separate from each other. In another example, the IR image sensing element and the visible light sensing element may be integrated together. In other words, a single sensing element may be used to generate both IR images and visible light images. A dedicated camera with communication capability is an example of the camera device (110). In one or more embodiments, the camera device (110) is a mobile device, such as a mobile phone with a built-in camera and a built-in microphone, referred to as a smart phone. A smart phone may have a display with graphical user interface that occupy a large portion (e.g., 70% or larger) of the front surface. The camera lens (111) may be on the front surface or back surface of the smart phone.

In one or more embodiments, the scene (140) is a place where an action or event, imaged by the camera device (110), occurs. In particular, the action or event may be associated with the sound source objects (e.g., sound source object A (142a), sound source object B (142b)). Further, one or more sound source objects may be stationary, moving from time to time, or constantly moving within the scene (140). The field-of-view (FOV) (141) is an extent of the scene (140) that is imaged by the camera device (110) using the camera lens (111). In other words, a sound source object (e.g., sound source object (142)) inside the FOV (141) will appear in an image captured and/or outputted by the camera device (110). For example, the FOV (141) may correspond to a solid angle within which the camera lens (111) projects light input to an associated optical sensor (not shown) of the camera device (110). In one or more embodiments, the FOV (141) corresponds to different portions of the scene (140) according to how the camera lens (111) is oriented toward, zoomed with respect to, or otherwise positioned relative to, the scene (140). In one or more embodiments, the sound source object (142) may move across the scene (140) during the action or event.

In one or more embodiments, object tracking is the action causing the camera lens (111) to be oriented toward, zoomed with respect to, or otherwise positioned relative to the scene (140) such that the sound source object(s) is continuously within the FOV (141), or aligned with a target position within the FOV (141), during image captures. Throughout this disclosure, the terms "object tracking" and "tracking" may be used interchangeably. In one or more embodiments, the camera device (110) includes a hardware component, a software component, or a combination thereof. In one or more embodiments, the camera device (110) may include, or otherwise be implemented using, at least a portion of the computing system (700) and network (720) described in reference to FIGS. 7.1 and 7.2 below.

In one or more embodiments of the invention, the direction control device (130) is configured to mechanically hold the camera device (110) and microphone (112), and to adjust, in response to a control signal from the directional sound capture controller (120), the orientation of the camera lens (111) and the sensitivity direction (113) of the microphone (112). For example, the direction control device (130) may include a motorized tilt and swivel device for adjusting orientation of the camera lens (111) that is aligned with the sensitivity direction (113) of the microphone (112). In another example, the direction control device (130) may include a motorized horizontal and vertical sliding device for adjusting a position of the camera lens (111) relative to the scene (140). The sliding device may include a mechanical stage for holding and moving the camera device (110) and the microphone (112). In one or more embodiments of the invention, the direction control device (130) adjusts the orientation of the camera device (110) by way of a mechanical tilt and/or swivel mechanism, and adjusts the sensitivity direction (113) of the microphone (112) by way of a beamforming signal processing operation. For example, the mechanical tilt and/or swivel mechanism and the beamforming signal processing operation are controlled by a control signal from the directional sound capture controller (120). Examples of the direction control device (130) are described in reference to FIGS. 3.1, 3.2, 3.3, and 3.4 below.

In one or more embodiments, the directional sound capture controller (120) includes a hardware component, a software component, or a combination thereof that is configured to determine a direction of a sound source object (e.g., sound source object A (142a), sound source object B (142b)) relative to the microphone (112). In one or more embodiments, the directional sound capture controller (120) is further configured to generate and transmit a control signal to the direction control device (130) for performing object tracking by continuously directing the microphone (112) toward the sound source object (e.g., sound source object A (142a), sound source object B (142b)). In one or more embodiments, the directional sound capture controller (120) includes the components described in reference to FIG. 1.2 below.

Although the light sources shown in FIG. 1.1 include both a local light emitter and a reflective light source, other configurations may also be possible where only local light emitters or only reflective light sources are used. For example, both light source A (143a) and light source B (143b) may be local light emitters. In another example, both light source A (143a) and light source B (143b) may be reflective light sources shone by a single remote light emitter (114).

Although the system (100) shown in FIG. 1.1 includes only one camera device and microphone, multiple camera devices and multiple microphones may be possible. For example, multiple camera devices and microphones may be configured to track different sound source objects with different encoded light sources simultaneously without conflict.

FIG. 1.2 shows details of the directional sound capture controller (120) in accordance with one or more embodiments. The following description of FIG. 1.2 refers to various components depicted in FIG. 1.1 above. In one or more embodiments, one or more of the modules and elements shown in FIG. 1.2 may be omitted, repeated, and/or substituted. Accordingly, embodiments of the invention should not be considered limited to the specific arrangements of modules shown in FIG. 1.2.

As shown in FIG. 1.2, the directional sound capture controller (120) includes a hardware processor (121), memory (122), and repository (123). In one or more embodiments of the invention, the hardware processor (121) corresponds to the computer processors (702) depicted in FIG. 7.1 below. Similarly, the memory (122) and repository (123) correspond to the non-persistent storage (704) and/or persistent storage (706) depicted in FIG. 7.1 below. For example, the memory (122) may store software instructions that, when executed, cause the hardware processor (121) to perform the functionalities of the directional sound capture controller (120) depicted in FIG. 1.1 above. In one or more embodiments, the directional sound capture controller (120) determines the direction of the sound source object and performs object tracking functionalities according to the method flowcharts described in reference to FIG. 2 below. In one or more embodiments, the memory (122) stores instructions to perform one or more portions of the method flowcharts described in reference to FIG. 2 below. In one or more embodiments, the directional sound capture controller (120) and the camera device (110) are integrated into a single device. In such embodiments, the instructions to perform one or more portions of the method flowcharts described in reference to FIG. 2 are part of a mobile application, or mobile app, which is a user-installable software application designed to run on a smart phone or other mobile devices.

Further as shown in FIG. 1.2, the repository (123) includes a sequence of images (126), a light change pattern (124), a displacement (125), a movement parameter (128), a target position (127), and a control signal (129). For example, the image A (126a) corresponds to a portion of the scene (140) that is covered by the FOV (141) at a particular time point. The light change pattern (124) is a pattern of light intensity and/or wavelength alternating between different intensity levels and/or wavelengths across the sequence of images (126).

In one or more embodiments, the light change pattern (124) corresponds to a spot in each image of the sequence of images (126). For example, the spot may be defined by a pixel position or a collection of connected pixel positions in each image. In this context, the light change pattern (124) is referred to as a local light change pattern captured by the camera device (110). In one or more embodiments, the light change pattern (124) is caused by a strobe light (e.g., strobe light A (115), strobe light B (117)) and indicates a location of the light source (e.g., light source A (143a), light source B (143b)) within each image. In other words, the location of the light source (e.g., light source A (143a), light source B (143b)) within each image may be determined based on where the light change pattern (124) is found across the sequence of images (126). For example, the light change pattern (124) indicates that the light source is at the location A (127a) in the image A (126a). Similarly, each other image in the sequence of images (126) is associated with a location of the light source. The target position (127) is a predetermined position that the directional sound capture controller (120) is configured for tracking the sound source object (e.g., sound source object A (142a), sound source object B (142b)). For example, the target position (127) may be defined as the center of the FOV (141), which corresponds to the center of each image of the sequence of images (126). In other words, the directional sound capture controller (120) is configured to adjust the FOV (141) such that the tracked sound source object appears at the center (i.e., target position (127)) in the image after the adjustment. In other examples, the target position (127) may be defined as another relative position (different from the center) within the FOV (141). The displacement (125) is the distance between the target position (127) and the location (e.g., location A (127a)) of the light source within an image. In one or more embodiments, the displacement (125) includes a horizontal direction distance and a vertical distance. The displacement (125) may be represented based on a number of pixels or any other suitable distance scale. In one or more embodiments, the sound source object may be a sound source object such that the location (e.g., location A (127a)) of the light source may vary from one image to next in the sequence of images (126). In such embodiments, the movement parameter (128) is a rate of change of the location (e.g., location A (127a)) of the light source over time. For example, the movement parameter (128) may include a change in the location (e.g., location A (127a)) of the light source from one image to next in the sequence of images (126). Depending on the moving direction of the tracked sound source object, the movement parameter (128) may include a horizontal portion and a vertical portion. Mathematically, the movement parameter (128) corresponds to a derivative of the displacement (125) over time.

In one or more embodiments, light change pattern (124) includes a light intensity change and/or a light wavelength change. In particular, the light intensity change and/or light wavelength change is associated with a repetition rate of the change. In one or more embodiments, the light intensity change and/or light wavelength change with associated repetition rate defines a digital code. For example, the digital code may include a header and subsequent digital pattern where the header and subsequent digital pattern may be re-occurring within the light change pattern (124). The digital code may be distinct for each light source in the scene (140) and used for identifying the sound source object attached with the light source. In this context, the digital code defined by the light intensity change and/or light wavelength change with associated repetition rate of the light change pattern (124) is referred to as an object-identifying code (124a). In one or more embodiments, the light intensity change and/or a light wavelength change are temporal change produced by the light emitter. In one or more embodiments, the light intensity change and/or a light wavelength change further include spatial change produced by the aforementioned geometric pattern of a reflective light source.

In one or more embodiments, the control signal (129) is a digital data message specifying camera orientation/zoom information and/or beamforming information used by a software application to perform object tracking and/or beamforming algorithm. For example, the digital data message may be transmitted wirelessly as the control signal (129). In one or more embodiments, the control signal (129) is an analog electrical signal that triggers hardware to perform camera orienting and/or zooming function for object tracking. For example, the analog electrical signal may be a wireless signal.

In one or more embodiments, the directional sound capture controller (120) determines the direction of sound source object(s) and performs object tracking functionalities based on the sequence of images (126), light change pattern (124), displacement (125), movement parameter (128), and target position (127) to generate the control signal (129) as described above. Examples of the sequence of images (126), light change pattern (124), object-identifying code (124a), displacement (125), movement parameter (128) are described in reference to FIGS. 4-6 below.

FIG. 2 shows a flowchart in accordance with one or more embodiments. The process shown in FIG. 2 may be executed, for example, by one or more components discussed above in reference to FIGS. 1.1 and 1.2. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

The flowchart depicted in FIG. 2 describes a method for determining the direction of sound source object(s) and performs object tracking functionalities for the sound source object(s). The sound source object(s) may be stationary, moving from time to time, or constantly moving within the scene.

Initially, in Step 201, a light source within a scene is activated. In one or more embodiments of the invention, the light source is a reflective region attached to a sound source object in the scene. In such embodiments, the reflective light source is activated by using a remote light emitter to emit and project a strobe light onto the reflective region. For example, the strobe light is emitted with a free-running light pattern when the remote light emitter is turned on. As a result, the strobe light is reflected by the reflective region to generate an object reflected light having the same free-running light pattern. In one or more embodiments of the invention, the light source is a local light emitter attached to a sound source object in the scene. In such embodiments, the light source is activated by activating the local light emitter to emit a strobe light. For example, the strobe light is emitted with a free-running light pattern when the local light emitter is turned on.

In one or more embodiments, the strobe light and the object reflected light have a low repetition rate (e.g., 10 hertz, 20 hertz, etc.) comparing to a frame rate of a camera device. In one or more embodiments, the strobe light and the object reflected light are synchronized with the frame rate of the camera device. For example, the strobe light may be initiated and/or synchronized based on a trigger signal sent from a tracking controller and/or the camera device. In one or more embodiments, intensity and/or wavelength of the strobe light and/or the object reflected light are changed with associated repetition rate(s) to define the object-identifying code.

In Step 202, a sequence of images of the scene is captured by a camera device. In particular, the sound source object is within the field-of-view (FOV) of the camera lens and appears in the sequence of images. For example, the sequence of images may include or be part of a burst of still images. In another example, the sequence of images may include or be part of a video recording. In one or more embodiments, the sequence of images of the scene is captured while the light source emits the object reflected light or strobe light. In one or more embodiments, the frame rate of the sequence of images is selected based on the duty cycle and/or repetition rate of the light source such that consecutive images (or a pair of images with a particular separation in the sequence) include alternating bright level and dark level, and/or alternating wavelengths from the light emitter. For example, the remote or local light emitter may be free running and the frame rate is selected based on the duty cycle and/or repetition rate of the free running light source. In one or more embodiments, the duty cycle and/or repetition rate of the light emitter is selected based on the frame rate of the sequence of images such that consecutive images (or a pair of images with a particular separation in the sequence) include alternating bright level and dark level, and/or alternating wavelengths from the light emitter. For example, the frame rate may be pre-determined and the light emitter is synchronized to the frame rate, e.g., based on a trigger signal from the camera device.

In Step 203, based on a local light change pattern across the sequence of images, the light source is detected in the scene. Specifically, the objected reflected light or strobe light from the light source causes changes in light intensity and/or wavelength received by an optical sensor of the camera device resulting in the local light change pattern across the sequence of images. In one or more embodiments, the intensity of the light source is adjusted to control the size of the location where the local light change pattern is found in each image. For example, the location size may be limited to a percentage (e.g., 1%, 3%, etc.) of the horizontal and vertical dimensions of the FOV. In one or more embodiments, the location and the size are defined where the difference in alternating bright level and dark level, and/or alternating wavelengths, in consecutive images, as recognized by the optical sensor of the camera device, exceeds a pre-determined threshold. In one or more embodiments, the location is referred to as the location of the light source in the image.

In one or more embodiments, a pair of images in the sequence of images are compared by subtraction of intensity and/or wavelength values of corresponding pixels. Specifically, the intensity and/or wavelength values are generated by the optical sensor. For example, the intensity values may correspond to pixel output values of a monochrome CMOS (complementary metal oxide semiconductor) sensor. In another example, output values of RGB CMOS sensor may be analyzed to determine the wavelength value of each pixel. In particular, the intensity and/or wavelength value of a pixel in one image is subtracted from the intensity and/or wavelength value of the corresponding pixel in another image to generate a subtraction result. The pixel where the difference in alternating bright level and dark level, and/or alternating wavelengths, is found in the subtraction result is selected as part of the location of the light source in the image. Depending on the duty cycle/repetition rate of the light source versus the frame rate of the sequence of images, the pair of images may be consecutive images or two images separated by a particular number of images, such as every three images, etc.

In one or more embodiments, an object-identifying code is extracted from the local light change pattern to identify the light source from multiple light sources within the scene. In one or more embodiments, the local light change pattern is analyzed to detect a pre-determined header pattern. Once detected, the pattern following the predetermined header pattern is extracted as the distinct code identifying a particular light source or corresponding sound source object. In one or more embodiments, the distinct code has a pre-determined length or number of digital bits that is used to de-limit the object-identifying code. In other embodiments, the object-identifying code may be delimited based on other criteria.

In one or more embodiments, multiple sound source objects within the scene are tracked concurrently where each sound source object is attached with an individual light source with distinct object-identifying code. In other words, multiple light change patterns are found at multiple locations across the sequence of images where each light change pattern includes a distinct object-identifying code that is different from any object-identifying code of other light change pattern. Accordingly, each light source is identified as distinct from other light sources based on respective light change patterns. Because each light source is uniquely associated with the sound source object it is attached, each sound source object is tracked individually across the sequence of images based on respective object-identifying codes.

In one or more embodiments, multiple light sources are detected and identified by iterating Steps 202 through 204. For example, each iteration may be based on a particular object-identifying code specified by a user input. In one or more embodiments, an image from the sequence of images is presented to a user interface window where a user may select a sound source object by clicking or otherwise selecting one of multiple detected light sources. Once selected, the object-identifying code of the selected light source is used to determined the location of the selected light source corresponding to the selected sound source object. Accordingly, the selected sound source object is tracked for continuing image capturing in Steps 205 through 209. From time to time, the user may select a different sound source object using the user interface, once the tracked sound source object is switched to a different sound source object, a different object-identifying code of the newly selected light source is used to determined the location of the newly selected light source corresponding to the newly selected sound source object. Accordingly, the newly selected sound source object is tracked for continuing image capturing in Steps 205 through 209.

In Step 204, the sequence of images is analyzed to determine a location of the detected and identified light source in at least one image and a movement of the light source across the sequence of images. In one or more embodiments, the location of the light source is determined based on where the difference in alternating bright level and dark level, and/or alternating wavelengths in the sequence of images, as recognized by the optical sensor of the camera device, exceeds the pre-determined threshold. In one or more embodiments, the movement of the light source is determined based on a rate of change of the location over the sequence of images.

In Step 205, in response to detecting and identifying the light source, the location of the light source and a target position within at least one image are compared to generate a result. In one or more embodiments, the result includes the displacement between the location and the target position. In one or more embodiments, the displacement may vary from one image to next in the sequence of images, indicating that the sound source object is a moving object. In such embodiments, the rate of change of the displacement over time, e.g., from one image to next, is computed as a movement parameter.

In Step 206, a control signal is generated based on the result for orienting the camera device and/or controlling the sensitivity direction of the microphone. In one or more embodiments, the control signal is configured to adjust the orientation of the camera lens in the opposite direction to the displacement. In one or more embodiments, the control signal is configured to adjust the relative position of the camera with respect to the scene in the opposite direction to the displacement. In one or more embodiments, the movement parameter is considered in fine tuning the amount of adjustment caused by the control signal. In one or more embodiments, control signal is used to orient the camera device and/or control the sensitivity direction of the microphone such that the optical axis of the camera lens and the sensitivity direction of the microphone are substantially aligned while tracking the sound source object.

In Step 207, the control signal is transmitted to a direction control device (e.g., a camera handheld grip, a tilt-and-swivel device, etc.) where the camera device and microphone are mounted. For example, the camera device and microphone may be rigidly coupled to each other before mounted together to the direction control device. In another example, the camera device and microphone may be separately mounted to the direction control device and coupled to each other by the direction control device. In one or more embodiments, coupling the microphone and the camera device causes a sensitivity direction of the microphone and an optical axis of the camera lens to be substantially aligned with each other. As a result of coupling the microphone and the camera device and in response to the control signal, the orientation of the camera lens/microphone or a relative position of the camera device/microphone is adjusted in the opposite direction to the displacement. In one or more embodiments, the sensitivity direction of the microphone is incrementally directed or oriented toward the sound source object by way of adjusting in the opposite direction to the displacement. In one or more embodiments, the microphone is a microphone array and the sensitivity direction of the microphone is incrementally directed or oriented toward the sound source object by way of adjusting the beamforming direction of the microphone array.

In Step 208, a substantial alignment between the target position and the light source is detected within the FOV of the camera device. In particular, the substantial alignment is a result of adjusting the orientation of the camera lens/microphone or the relative position of the camera device/microphone in the opposite direction to the displacement.

In Step 209, in response to detecting the substantial alignment, sound emitted from the sound source object is captured using the microphone. Because the substantial alignment corresponds to aligning the sensitivity direction of the microphone with the direction of the sound source object, the sound is captured based on the higher sensitivity of the microphone along the sensitivity direction.

In one or more embodiments, the captured sound is monitored to detect any change of the sound volume exceeding a pre-determined threshold. For example, a change of the sound volume exceeding the pre-determined threshold may indicate a misalignment of the sensitivity direction of the microphone and the direction of the sound source object. Accordingly, a corrective action may be initiated, such as returning to Step 202 above.

In one or more embodiments, the captured sound is analyzed to generate a sound signature of the tracked sound source object. For example, the sound signature may represent voice characteristics of a human, animal, or robot as the sound source object. Accordingly, the sound signature may be used in further signal processing (e.g., filtering) of the captured sound or other sound recording.

In one or more embodiments, the captured sound is analyzed to generate a correlation with a mouth shape (or other facial expression) of a human, animal, or robot as the sound source object. For example, the mouth shape may be generated by applying mouth shape recognition algorithms to the one or more images captured in Step 202 above. Accordingly, the correlation may be used to improve voice recognition of the captured sound.

In one or more embodiments, the captured sound is analyzed to determine a signal-to-noise S/N ratio while adjusting the sensitivity direction of the microphone. The S/N ration may form a peaked distribution (e.g., Gaussian distribution) centered around a peaked sound direction. Accordingly, the peaked sound direction may be used to fine tune the control signal such that the optical axis of the camera lens and/or the sensitivity direction of the microphone are substantially aligned with the peaked sound direction.

In Step 210, a determination is made as to whether sound capturing is to continue. If the determination is positive, i.e., the sound capturing is to continue, the method proceeds to Step 211. If the determination is negative, i.e., the sound capturing is not to continue, the method ends.

In Step 211, a determination is made as to whether sound capturing is to continue by tracking the same sound source object or by tracking a different sound source object. As noted above, the determination in Step 211 may be based on a user input received during the iteration of Steps 202 through 209 leading to Step 211. If the determination indicates to continue the sound capturing by tracking the same sound source object, the method returns to Step 202. If the determination indicates to continue the sound capturing by tracking a different sound source object, the method returns to Step 203. In one or more embodiments, the different sound source object may be detected by automatically recognizing a pre-determined sound reflecting object (e.g., wall, desk, chair, etc.) in one or more images captured in Step 202 above. For example, Accordingly, environmental sound field analysis and/or synthesis may be performed based on capturing sound from a collection of sound source objects in the scene. In particular, the collection of sound source object may include one or more sound source objects attached with corresponding light sources as well as sound reflecting object automatically detected from captured images.

FIGS. 3.1, 3.2, 3.3, 3.4, 4, 5, and 6 show various examples in accordance with one or more embodiments of the invention. The examples shown in FIGS. 3.1, 3.2, 3.3, 4, 5, and 6 may be, for example, based on one or more components depicted in FIGS. 1.1 and 1.2 above and the method flowchart depicted in FIG. 2 above. In one or more embodiments, one or more of the modules and elements shown in FIGS. 3.1, 3.2, 3.3, 3.4, 4, 5, and 6 may be omitted, repeated, and/or substituted. Accordingly, embodiments of the invention should not be considered limited to the specific arrangements of modules shown in FIGS. 3.1, 3.2, 3.3, 3.4, 4, 5, and 6.

FIG. 3.1 shows a single device (310) as an integrated example of the camera device (110), microphone (112) and directional sound capture controller (120) depicted in FIG. 1.1 above. As shown in FIG. 3.1, the single device (310) is rotationally coupled to the direction control device (130) along the rotational axis (315). In one example, the single device (310) and the direction control device (130) are separable and rotationally coupled to each other. In another example, the direction control device (130) is a rotational base integrated with the single device (310).

In an example scenario, the single device (310), camera lens (311), and microphone (312) correspond to the camera device (110), camera lens (111), and microphone (112) depicted in FIG. 1.1 above. The camera lens (311) and the microphone (312) are coupled to each other via a rigid enclosure of the single device (310). Accordingly, the optical axis (314) of the camera lens (311) and the sensitivity direction (313) of the microphone (312) are substantially aligned to each other. In one or more embodiments, the microphone (312) includes three microphones arranged as a microphone array to concentrate the sound capture sensitivity along the sensitivity direction (313). In the description below, microphone and microphone array may be used interchangeably, and a microphone may be or may not be part of a microphone array. By aligning a location of the light source A (143a) to a center position of an image captured by the camera lens (311), the sensitivity direction (313) is oriented toward the sound source object A (142a) for optimal sound capture. A user may change object tracking from the sound source object A (142a) to the sound source object B (142b). In response to such change, the location of the light source B (143b) is aligned to the center position of an image captured by the camera lens (311) such that the sensitivity direction (313) is oriented toward the sound source object B (142b) for optimal sound capture.

In an alternative configuration, the microphone (312) may be disabled or otherwise omitted from the single device (310). In such alternative configuration, an external microphone (not shown) may be mounted to the single device (310) via a rigid coupling slot (316) and connected to the single device (310) via the connector (317).

In another alternative configuration, the camera lens (311) may be disabled or otherwise omitted from the single device (310). In such alternative configuration, a camera mobile device (201) may be mounted to the single device (310) via a rigid coupling slot (316) and wirelessly (e.g., via Bluetooth, NFC, USB, WiFi, or other wireless/wired communication interfaces) connected to the single device (310). The camera mobile device (201) (e.g., a smartphone or a dedicated camera with communication capability) corresponds to the camera device (110) depicted in FIG. 1.1 above. The single device (310) corresponds to the combination of the microphone (112) and the directional sound capture controller (120) depicted in FIG. 1.1 above.

In yet another alternative configuration, the camera lens (311) and microphone (312) may be disabled or otherwise omitted from the single device (310). In such alternative configuration, a camera mobile device (201) may be mounted to the single device (310) via a rigid coupling slot (316) and wirelessly (e.g., via Bluetooth, NFC, USB, WiFi, or other wireless/wired communication interfaces) connected to the single device (310). The camera mobile device (201) (e.g., a smartphone or a dedicated camera with communication capability) corresponds to the combination of the camera device (110) and the microphone (112) depicted in FIG. 1.1 above. The single device (310) corresponds to the directional sound capture controller (120) depicted in FIG. 1.1 above.

In still another alternative configuration, the camera lens (311), microphone (312), and camera mobile device (201) may all be enabled. The camera lens (311) may be dedicated for tracking the sound source object, while the camera mobile device (201) may be dedicated for capturing and outputting images of the sound source object. In such configuration, the camera lens (311) and camera mobile device (201) together correspond to the camera device (110) depicted in FIG. 1.1 above.

FIG. 3.2 shows a motorized camera mobile device stand (210) as an example of the direction control device (130) depicted in FIG. 1.1 above. In addition, a camera mobile device (201) (e.g., a smart phone having a camera lens (311) and microphone (312)), mechanically held by the motorized camera mobile device stand (210), is an example of the camera device (110) and microphone (112) depicted in FIG. 1.1 above. The directional sound capture controller (120) may be embedded within the motorized camera mobile device stand (210) and/or the camera mobile device (201). In one or more embodiments of the invention, the motorized camera mobile device stand (210) is an electro-mechanical assembly that includes a holder (221), a tilting shaft (203), an U-bracket (204), a rotating shaft (209), and a stand (222). The holder (221) is configured to mechanically hold the camera mobile device (201) and mechanically couple to the tilting shaft (203). The stand (222) is configured to maintain, while being placed on a solid surface, mechanical stability of the motorized camera mobile device stand (210). Although not explicitly shown, the U-bracket (204) houses a tilting motor coupled to the tilting shaft (203), a rotating motor coupled to the rotating shaft (209), and a communication interface configured to communicate with the camera device (110) depicted in FIG. 1.1 above. For example, the communication interface may be based on Bluetooth, NFC, USB, WiFi, or other wireless/wired communication interfaces. In one or more embodiments, the rotating shaft (209) is rotatable around a rotating axis (209-1) by the rotating motor in response to a control signal received from the directional sound capture controller (120) via the communication interface. Similarly, the tilting shaft (203) is rotatable by the tilting motor around a tilting axis (203-1) in response to the control signal received from the directional sound capture controller (120) via the communication interface. In response to tilting the holder (221) around the tilting axis (203-1) and/or rotating the holder (221), collectively with the tilting shaft (203) and the bracket (204), around the rotating axis (209-1), the orientation of the camera lens (311) and microphone (312) may be adjusted.

FIG. 3.3 shows a camera mobile device handheld grip (800) as an example of the direction control device (130) depicted in FIG. 1.1 above. In addition, a camera mobile device (201) (e.g., a smart phone having a camera lens (311) and microphone (312)), mechanically held by the camera mobile device handheld grip (800), is an example of the camera device (110) and microphone (112) depicted in FIG. 1.1 above. The directional sound capture controller (120) may be embedded within the motorized camera mobile device stand (210) and/or the camera mobile device (201). In one or more embodiments of the invention, the camera mobile device handheld grip (800) is an electro-mechanical assembly that includes a holder (221), a tilting shaft (203), an tilting motor (213), a rotating shaft (209), a rotating motor (219), and a handheld grip (222). The holder (221) is configured to mechanically hold the camera mobile device (201) and mechanically couple to the tilting shaft (203). The handheld grip (222) is configured to maintain, while being handheld by a viewer, mechanical stability of the camera mobile device handheld grip (800). Although not explicitly shown, the handheld grip (222) includes a communication interface configured to communicate with the camera device (110) depicted in FIG. 1.1 above. For example, the communication interface may be based on Bluetooth, NFC, USB, WiFi, or other wireless/wired communication interfaces. In one or more embodiments, the rotating shaft (209) is rotatable around a rotating axis (209-1) by the rotating motor (219) in response to a control signal received from the directional sound capture controller (120) via the communication interface. Similarly, the tilting shaft (203) is rotatable by the tilting motor (213) around a tilting axis (203-1) in response to the control signal received from the directional sound capture controller (120) via the communication interface. In response to tilting the holder (221) around the tilting axis (203-1) and/or rotating the holder (221), collectively with the tilting shaft (203) and tilting motor (213), around the rotating axis (209-1), the orientation of the camera lens (311) and microphone (312) may be adjusted. Although the example shown in FIG. 3.3 is based on two motors associated with two mechanical shafts, other examples may be based on three motors associated with three mechanical shafts without departing from the scope of the invention wherein the third motor may be an additional rotating motor, such as the additional rotating motor (331) with the additional rotating axis (209-2) shown in FIG. 3.4. Specifically, FIG. 3.4 shows a camera mobile device handheld grip (800) with three motors as an example of the direction control device (130) depicted in FIG. 1.1 above.

Figure 4:
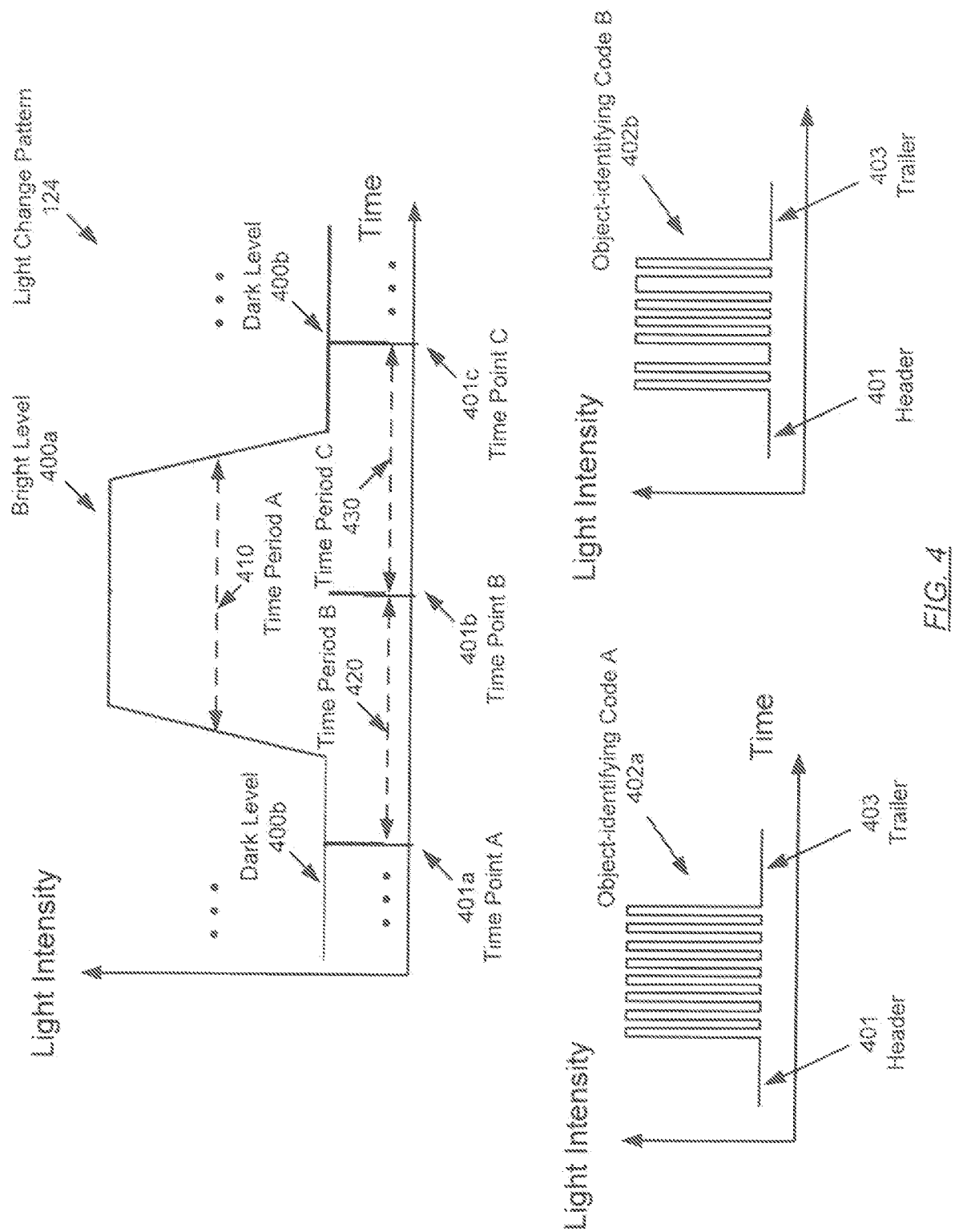

FIG. 4 shows an example of the light change pattern (124) of the light source (e.g., light source A (143a), light source B (143b)) depicted in FIGS. 1.1 and 1.2 above. As shown in FIG. 4, the horizontal axis corresponds to time and the vertical axis corresponds to light intensity. In particular, the light change pattern (124) is a pattern of light intensity alternating between a bright level (400a) and a dark level (400b) over time. For example, the bright level (400a) of the light intensity sustains over a time period A (410) and may be recurring over time with certain repetition rate. While the light intensity alternates between the bright level (400a) and the dark level (400b) over time, a sequence of images is captured by a camera device periodically. For example, consecutive images in the sequence may be captured at a time point A (401a), time point B (401b), time point C (401c), etc. that are separate from each other by a time period B (420), time period C (430), etc. In particular, the time period A (410) encompasses at least one image capture time point, such as the time point B (401b). The alternating sequence of dark level (400b) captured at time point A (401a), bright level (400a) captured at time point B (401b), dark level (400b) captured at time point C (401c), etc. forms the aforementioned local light change pattern captured by the camera device. Although the light change pattern (124) depicted in FIG. 4 is a pattern of light intensity changes, the light change pattern (124) may also include wavelength changes in other examples. In other words, the bright level (400a) and dark level (400b) may be substituted or supplemented by different wavelengths to represent wavelength changes.

The light change pattern (124) depicted in FIG. 4 may be extended along the time axis across a sequence of time points and images to define an object-identifying code. For example, the object-identifying code A (402a) and object-identifying code B (402b) are shown in FIG. 4 below the light change pattern (124) using a different time scale. In one or more embodiments, the light intensity level and/or wavelength value in each image defines a digital data bit. In other embodiments, the light intensity level and/or wavelength value is constant across each of a number of recurring sets of images where each image set corresponds to a digital data bit. In other words, a digital data bit may correspond to a single image or an image set. In each of the object-identifying code A (402a) and object-identifying code B (402b), a distinct digital data bit pattern is delimited by a header (401) and a trailer (403). For example, the header (401) and trailer (403) may each contain 8 consecutive "zero" digital data bits. Inserted between the header (401) and trailer (403), the object-identifying code A (402a) includes a digital data bit pattern of "1010101010101010" while the object-identifying code B (402b) includes a digital data bit pattern of "1010010101011010". Accordingly, the digital data bit pattern of "1010101010101010" and the digital data bit pattern of "1010010101011010" are used to identify or select two distinct light sources attached to two distinct sound source objects within the scene (140) depicted in FIGS. 1.1 and 1.2 above.

Figure 5:
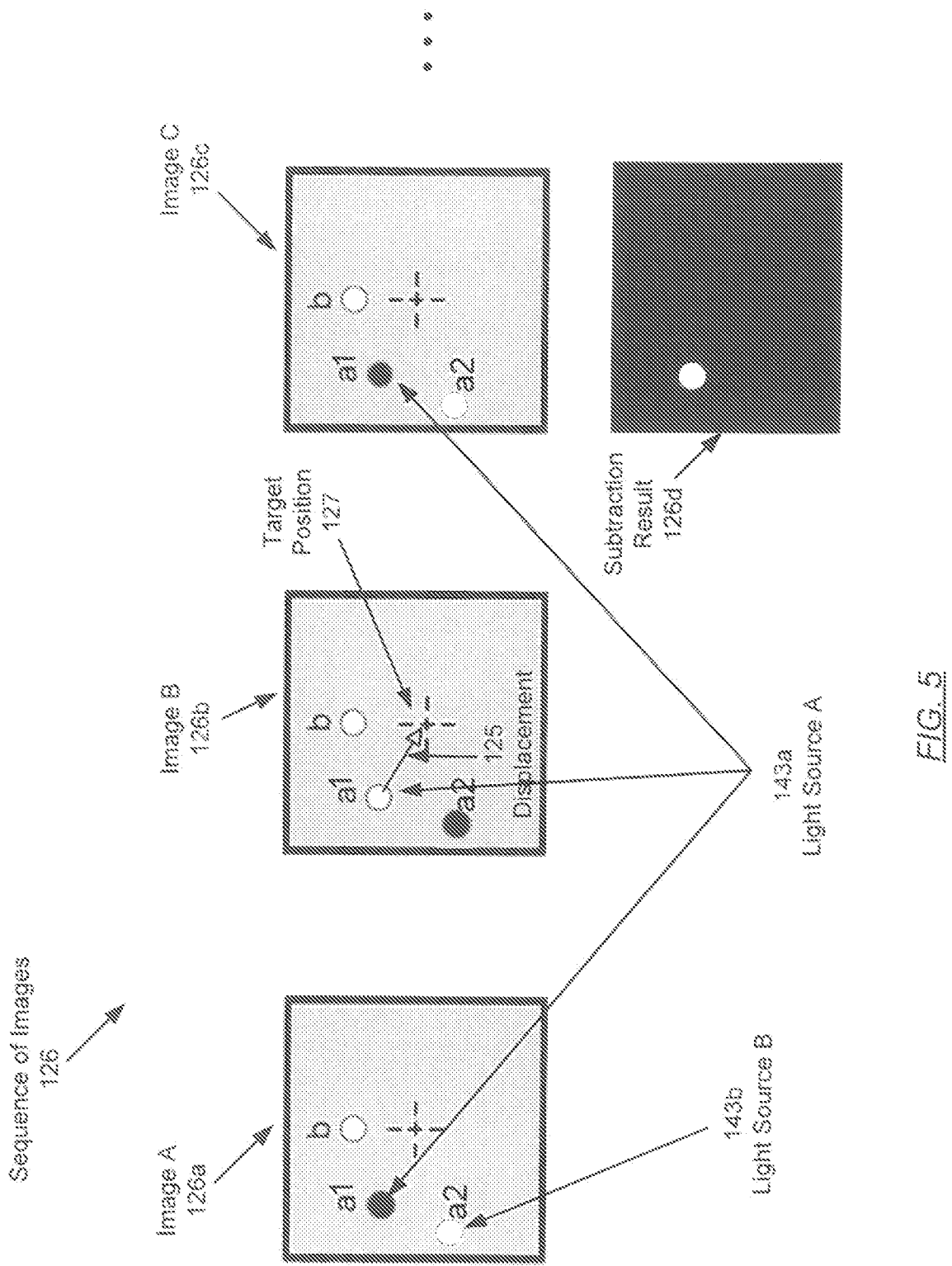

FIG. 5 shows an example of the sequence of images (126) of the scene (140) depicted in FIGS. 1.1 and 1.2 above. As shown in FIG. 5, the sequence of images (126) includes the image A (126a), image B (126b), image C (126c), etc. that are captured at the time point A (401a), time point B (401b), time point C (401*c*), etc. depicted in FIG. 4 above. According to the example of the light change pattern (124) described in reference to FIG. 4 above, the light source (e.g., light source A (143*a*), light source B (143*b*)) appears as an alternating dark and bright spot at a location marked "a1" or a location marked "a2" in the image A (126*a*), image B (126*b*), image C (126*c*), etc. In contrast, the light intensity remains substantially constant at another location marked "b" in the image A (126*a*), image B (126*b*), image C (126*c*), etc. For example, the location marked "a1" may be determined by subtracting intensity values of corresponding pixels in the image A (126*a*) and image B (126*b*) to generate the subtraction result (126*d*). Similarly, the location marked "a1" may be further determined by subtracting intensity values of corresponding pixels in the image B (126*b*) and image C (126*c*) to generate the subtraction result (126*d*). In the subtraction result (126*d*), black color indicates no difference and white color indicates a non-zero difference or a difference exceeding the aforementioned pre-determined threshold. Accordingly, the location of the light source (e.g., light source A (143*a*)) corresponds to the white spot in the subtraction result (126*d*). In another example, the location marked "a2" may be determined in a similar manner to detect the location of a different light source (e.g., light source B (143*b*)) within the images.

Further as shown in FIG. 5, the center of each image is defined as the target position (127). Accordingly, the distance from the location marked "a1" to the target position (127) corresponds to the displacement (125). The location marked "a1", the target position (127), and the displacement (125) shown in FIG. 5 are examples of the location A (127*a*), target position (127), and displacement (125), respectively, depicted in FIG. 1.2 above. In one or more embodiments, the location marked "a1" varies between the image A (126*a*), image B (126*b*), image C (126*c*), etc. The rate of change of the location marked "a1" across image A (126*a*), image B (126*b*), image C (126*c*), etc. corresponds to the movement parameter (128) depicted in FIG. 1.2 above. Although not explicitly shown, the displacement (125) and/or movement parameter (128) may also correspond to the location marked "a2" in a different example.

Figure 6:
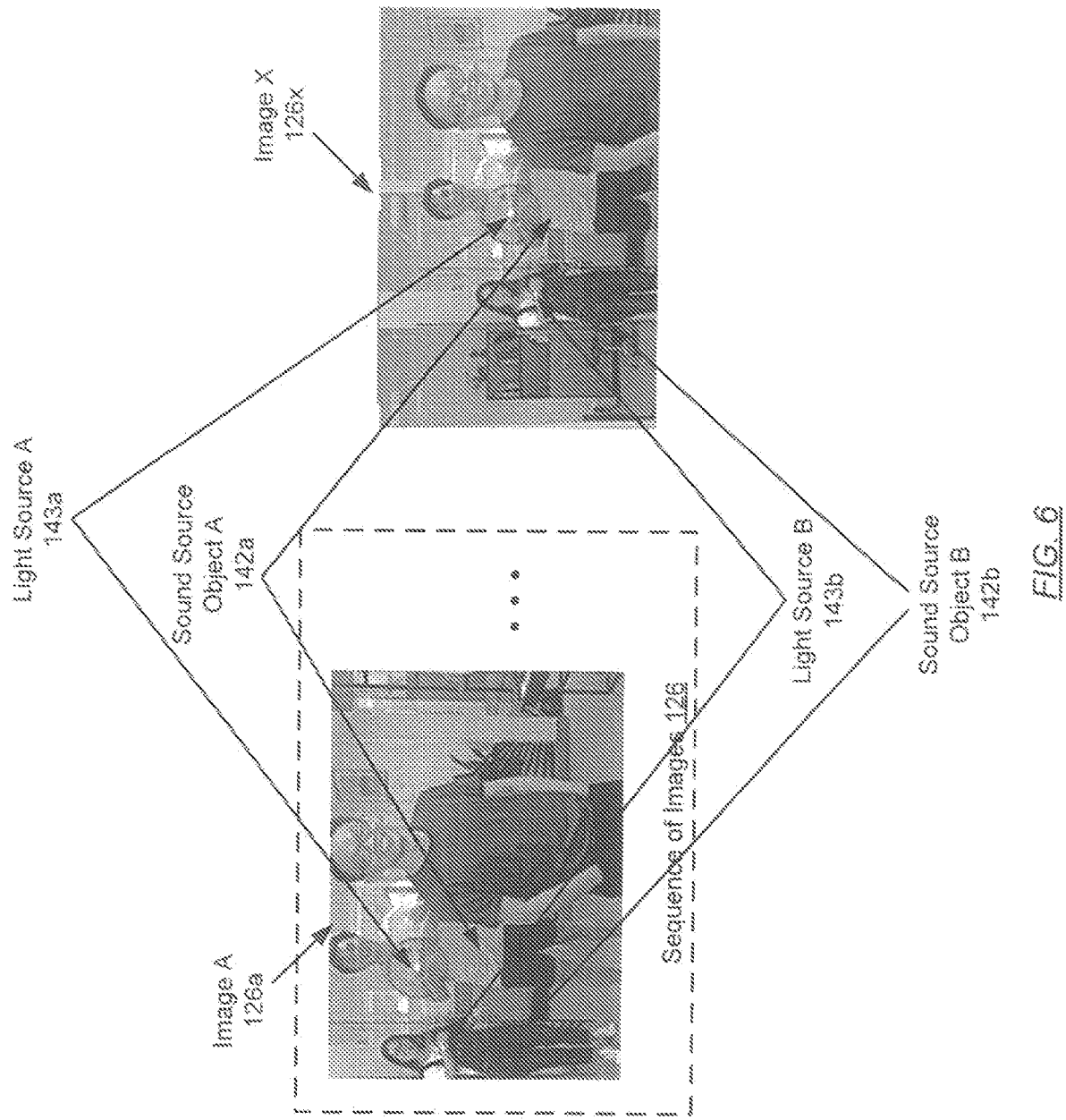

FIG. 6 shows an example of the sequence of images (126) and light changing pattern (124) described in reference to FIGS. 1.2 and 4 above. In an example scenario, the target position is the center of the image. As shown in FIG. 6 when the object-identifying code A (402*a*) depicted in FIG. 4 above is used for object tracking, the light source A (143*a*) is identified at a location in the left portion of the images (e.g., image A (126*a*)) in the sequence of images (126). In particular, the light source A (143*a*) is reflective material included in a finger ring or part of a wrist band worn by a male person (i.e., sound source object A (142*a*)). For example, the location of the light source A (143*a*) is identified based on the alternating dark and bright spot "a1" in the image A (126*a*), image B (126*b*), image C (126*c*), etc. depicted in FIG. 5 above. In particular, the alternating dark and bright spot "a1" in the image A (126*a*), image B (126*b*), image C (126*c*), etc. exhibits temporal and/or spatial variation that defines the object-identifying code A (402*a*) associated with the light source A (143*a*). Because the target position (i.e., image center) is to the right of the light source location, the sound source object directional sound capture controller (120) is configured to orient the camera device (110) toward the left such that the male person (i.e., sound source object A (142*a*)) holding/wearing the light source A (143*a*) appears in the center of the image. Accordingly, using the object-identifying code A (402*a*), the orientation of the camera device (110) is adjusted based on the identified location "a1" of the light source A (143*a*) such that the sound source object A (142*a*) appears in the center of the image X (126*x*), which is one of the sequence of images (126) subsequent to the image A (126*a*), image B (126*b*), image C (126*c*). Because the camera device (110) and the microphone (112) are coupled to each other, the sensitivity direction of the microphone (112) is directed or oriented toward the sound source object A (142*a*). By directing/orienting the sensitivity direction of the microphone (112) toward the sound source object A (142*a*), sound emitted by the sound source object A (142*a*) (e.g., sound uttered by the male person) is captured with higher sensitivity of the microphone (112) along the sensitivity direction.

Further as shown in FIG. 6 when the object-identifying code B (402*b*) depicted in FIG. 4 above is used for object tracking, the light source B (143*b*) is identified at a location in the left portion of the images (e.g., image A (126*a*)) in the sequence of images (126). In particular, the light source B (143*b*) is a finger ring or part of a wrist band worn by a female person (i.e., sound source object B (142*b*)). For example, the location of the light source B (143*b*) is identified based on the alternating dark and bright spot "a2" in the image A (126*a*), image B (126*b*), image C (126*c*), etc. depicted in FIG. 5 above. In particular, the alternating dark and bright spot "a2" in the image A (126*a*), image B (126*b*), image C (126*c*), etc. exhibits temporal and/or spatial variation that defines the object-identifying code B (402*b*) associated with the light source B (143*b*). Because the target position (i.e., image center) is to the right of the light source location, the directional sound capture controller (120) is configured to orient the camera device (110) toward the left such that the female person (i.e., sound source object B (142*b*)) holding/wearing the light source B (143*b*) appears in the center of the image. Accordingly, using the object-identifying code B (402*b*), the orientation of the camera device (110) is adjusted based on the identified location "a2" of the light source B (143*b*) such that the sound source object B (142*b*) appears in the center of the image X (126*x*). Because the camera device (110) and the microphone (112) are coupled to each other, the sensitivity direction of the microphone (112) is directed or oriented toward the sound source object A (142*a*). By directing/orienting the sensitivity direction of the microphone (112) toward the sound source object B (142*b*), sound emitted by the sound source object B (142*b*) (e.g., sound uttered by the female person) is captured with higher sensitivity of the microphone (112) along the sensitivity direction.

By attaching different light sources having distinct object-identifying codes to multiple sound source objects in the scene, object tracking may be switched expediently between different sound source objects in the scene. For example, sound recording may continue without disruption while switching the tracked sound source object from the male person to the female person as described above.

To improve accuracy of object tracking, in addition to detecting the location of the reflective light source (143) based on the alternating dark and bright spot in the image A (126*a*), image B (126*b*), image C (126*c*), etc. depicted in FIG. 5 above, the geometric shape of the alternating dark and bright spot is qualified based on matching the geometric shape of the reflective material included in a finger ring or part of a wrist band worn by a male person (i.e., sound source object (142)). In other words, any alternating dark and bright spot in the image A (126*a*), image B (126*b*), image C (126c), etc. that does not match the geometric shape of the reflective pattern is excluded in identifying the reflective light source (143).

Embodiments of the invention may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the invention.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7.1 may implement and/or be connected to a data repository. For example, one type of data repository is a database. A database is a collection of information configured for ease of data retrieval, modification, reorganization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7.1 and the nodes and/or client device in FIG. 7.2. Other functions may be performed using one or more embodiments of the invention.

The one or more embodiment of the invention may be useful in many scenarios. For example, in a scenario of family recording with a child, the child can be tracked with the camera device and the sound of the child may be simultaneously recorded using the microphone at a direction of high sensitivity. Even when the child is moving around, improved voice recording may be achieved based on determining where the sound source object is.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for directional sound capture, comprising:
capturing, using a camera device, a sequence of images of a scene comprising a light source attached to a sound source object;
detecting, by a hardware processor based on a pattern of local light change across the sequence of images, the light source in the scene;
determining a direction of the sound source object by at least determining a location of the light source in at least one image of the sequence of images;
transmitting, to a direction control device coupled to a microphone, a control signal to direct a sensitivity direction of the microphone towards the sound source object; and
capturing, using the microphone and in response to directing the sensitivity direction of the microphone towards the sound source object, the sound emitted from the sound source object.

2. The method of claim 1, further comprising:
comparing, by the hardware processor in response to detecting the light source, the location of the light source in at least one image of the sequence of images and a target position within the at least one image to generate a result, wherein the target position corresponds to an orientation of the microphone; and
generating, by the hardware processor, the control signal based on the result to align the sensitivity direction of the microphone with the direction of the sound source object.

3. The method of claim 2,
wherein the control signal adjusts at least one selected from a group consisting of movements of the direction control device and a beamforming algorithm of the direction control device to direct the sensitivity direction of the microphone towards the sound source object.

4. The method of claim 3,
wherein the control signal is based on the result for changing a field-of-view of the camera device such that the light source substantially aligns with the target position within the field-of-view,
wherein the microphone is coupled to the camera device such that substantially aligning the light source with the target position aligns the orientation of the microphone and the direction of the sound source object, and
wherein the movements of the direction control device substantially align the light source with the target position to direct the microphone towards the sound source object.

5. The method of claim 1,
wherein the light source is at least one selected from a group consisting of a local light emitter attached to the sound source object and a reflective region of the sound source object emitting a sound source object-reflected light in response to a remote light emitter separate from the sound source object,
wherein the pattern of local light change across the sequence of images is produced by at least one selected from a group consisting of the local light emitter, the remote light emitter, and a geometric reflection pattern of the reflective region, and
wherein the pattern of local light change comprises at least one selected from a group consisting of a light intensity change, a light wavelength change, a repetition rate of the light intensity change, and a repetition rate of the light wavelength change.

6. The method of claim 1, wherein the light source is configured to produce an object-identifying code, the method further comprising:
extracting the object-identifying code from the pattern of local light change; and
identifying, from a plurality of light sources associated with a plurality of sound source objects in the scene, the detected light source based on the extracted object-identifying code to select the sound source object from the plurality of sound source objects.

7. The method of claim 1, further comprising:
analyzing the sequence of images to determine the location of the light source in the at least one image and a movement of the light source across the sequence of images,
wherein generating the control signal is further based on the movement.

8. A directional sound capture controller, comprising:
a computer processor; and
memory coupled to the computer processor and storing instructions, when executed, causing the computer processor to:
capture, using a camera device, a sequence of images of a scene comprising a light source attached to a sound source object;
detect, based on a pattern of local light change across the sequence of images, the light source in the scene;
determine a direction of the sound source object by at least determining a location of the light source in at least one image of the sequence of images;
generate, based on the direction of the sound source object, a control signal for directing a sensitivity direction of a microphone towards the sound source object; and
capture, using the microphone and in response to the control signal, sound emitted from the sound source object.

9. The directional sound capture controller of claim 8, the instructions, when executed, further causing the computer processor to:
compare, in response to detecting the light source, the location of the light source in at least one image of the sequence of images and a target position within the at least one image to generate a result,
wherein the target position corresponds to an orientation of the microphone, and
wherein the control signal is generated based on the result to align the sensitivity direction of the microphone with the direction of the sound source object.

10. The directional sound capture controller of claim 9, the instructions, when executed, further causing the computer processor to:
transmit the control signal to a direction control device where the microphone is mounted,
wherein the control signal adjusts at least one selected from a group consisting of movements of the direction control device and a beamforming algorithm of the direction control device to direct the sensitivity direction of the microphone towards the sound source object.

11. The directional sound capture controller of claim 10, wherein the control signal is generated based on the result for changing a field-of-view of the camera device such that the light source substantially aligns with the target position within the field-of-view, wherein the microphone is rigidly coupled to the camera device such that substantially aligning the light source with the target position aligns the orientation of the microphone and the direction of the sound source object, and wherein the movements of the direction control device substantially align the light source with the target position to direct the microphone towards the sound source object.

12. The directional sound capture controller of claim 8, wherein the light source is at least one selected from a group consisting of a local light emitter attached to the sound source object and a reflective region of the sound source object emitting a sound source object-reflected light in response to a remote light emitter separate from the sound source object, wherein the pattern of local light change across the sequence of images is produced by at least one selected from a group consisting of the local light emitter, the remote light emitter, and a geometric reflection pattern of the reflective region, and wherein the pattern of local light change comprises at least one selected from a group consisting of a light intensity change, a light wavelength change, a repetition rate of the light intensity change, and a repetition rate of the light wavelength change.

13. The directional sound capture controller of claim 8, wherein the light source is configured to produce an object-identifying code, the instructions, when executed, further causing the computer processor to:

extract the object-identifying code from the pattern of local light change; and identify, from a plurality of light sources associated with a plurality of sound source objects in the scene, the detected light source based on the extracted object-identifying code to select the sound source object from the plurality of sound source objects.

14. The directional sound capture controller of claim 8, the instructions, when executed, further causing the computer processor to:

analyze the sequence of images to determine the location of the light source in the at least one image and a movement of the light source across the sequence of images, wherein generating the control signal is further based on the movement.

15. A system for directional sound capture, comprising:
a light source attached to a sound source object in a scene;
a camera device configured to capture a sequence of images of the scene;
a microphone for the directional sound capture;
a direction control device coupled to the camera device and the microphone; and
a directional sound capture controller configured to:
detect, based on a pattern of local light change across the sequence of images, the light source in the scene;
determine a direction of the sound source object by at least determining a location of the light source in at least one image of the sequence of images;
generate, based on the direction of the sound source object, a control signal for directing a sensitivity direction of a microphone towards the sound source object; and
capture, using the microphone and in response to the control signal, sound emitted from the sound source object.

16. The system of claim 15, the directional sound capture controller further configured to:

compare, in response to detecting the light source, the location of the light source in at least one image of the sequence of images and a target position within the at least one image to generate a result, wherein the target position corresponds to an orientation of the microphone, and wherein the control signal is generated based on the result to align the sensitivity direction of the microphone with the direction of the sound source object.

17. The system of claim 16, the directional sound capture controller further configured to:

transmit the control signal to a direction control device where the microphone is mounted, wherein the control signal adjusts at least one selected from a group consisting of movements of the direction control device and a beamforming algorithm of the direction control device to direct the sensitivity direction of the microphone towards the sound source object.

18. The system of claim 17, wherein the control signal is generated based on the result for changing a field-of-view of the camera device such that the light source substantially aligns with the target position within the field-of-view, wherein the microphone is rigidly coupled to the camera device such that substantially aligning the light source with the target position aligns the orientation of the microphone and the direction of the sound source object, and wherein the movements of the direction control device substantially align the light source with the target position to direct the microphone towards the sound source object.

19. The system of claim 15, wherein the light source is at least one selected from a group consisting of a local light emitter attached to the sound source object and a reflective region of the sound source object emitting a sound source object-reflected light in response to a remote light emitter separate from the sound source object, wherein the pattern of local light change across the sequence of images is produced by at least one selected from a group consisting of the local light emitter, the remote light emitter, and a geometric reflection pattern of the reflective region, and wherein the pattern of local light change comprises at least one selected from a group consisting of a light intensity change, a light wavelength change, a repetition rate of the light intensity change, and a repetition rate of the light wavelength change.

20. The system of claim 15, wherein the light source is configured to produce an object-identifying code, the directional sound capture controller further configured to:

extract the object-identifying code from the pattern of local light change; and identify, from a plurality of light sources associated with a plurality of sound source objects in the scene, the detected light source based on the extracted object-identifying code to select the sound source object from the plurality of sound source objects.

21. The system of claim 15, the directional sound capture controller further configured to:
analyze the sequence of images to determine the location of the light source in the at least one image and a movement of the light source across the sequence of images,
wherein generating the control signal is further based on the movement.

22. A non-transitory computer readable medium storing instructions for analyzing a sound source object in a scene, the instructions, when executed by a computer processor, comprising functionality for:
capturing, using a camera device, a sequence of images of a scene comprising a light source attached to a sound source object;
detecting, based on a pattern of local light change across the sequence of images, the light source in the scene;
determining a direction of the sound source object by at least determining a location of the light source in at least one image of the sequence of images;
transmitting, to a direction control device coupled to a microphone, a control signal to direct a sensitivity direction of the microphone towards the sound source object; and
capturing, using the microphone and in response to directing the sensitivity direction of the microphone towards the sound source object, the sound emitted from the sound source object.

* * * * *